US012219960B2

(12) United States Patent
Jones et al.

(10) Patent No.: US 12,219,960 B2
(45) Date of Patent: *Feb. 11, 2025

(54) METHODS AND COMPOSITIONS FOR IMPROVING SOYBEAN YIELD

(71) Applicant: NewLeaf Symbiotics, Inc., St. Louis, MO (US)

(72) Inventors: Marcus Jones, Ballwin, MO (US); Gregg Bogosian, Clarkson Valley, MO (US)

(73) Assignee: NewLeaf Symbiotics, Inc., St. Louis, MO (US)

( * ) Notice: Subject to any disclaimer, the term of this patent is extended or adjusted under 35 U.S.C. 154(b) by 947 days.

This patent is subject to a terminal disclaimer.

(21) Appl. No.: 17/219,794

(22) Filed: Mar. 31, 2021

(65) Prior Publication Data

US 2021/0321622 A1 Oct. 21, 2021

Related U.S. Application Data

(62) Division of application No. 15/100,947, filed as application No. PCT/US2014/068660 on Dec. 4, 2014, now Pat. No. 10,993,443.

(60) Provisional application No. 61/911,698, filed on Dec. 4, 2013.

(51) Int. Cl.
*A01N 25/00* (2006.01)
*A01N 63/00* (2020.01)
*A01N 63/20* (2020.01)

(52) U.S. Cl.
CPC ............ *A01N 63/20* (2020.01); *A01N 25/00* (2013.01); *A01N 63/00* (2013.01); *Y02A 40/10* (2018.01)

(58) Field of Classification Search
None
See application file for complete search history.

(56) References Cited

U.S. PATENT DOCUMENTS

| | | | |
|---|---|---|---|
| 4,336,334 A | 6/1982 | Powell et al. | |
| 5,106,648 A | 4/1992 | Williams | |
| 5,302,525 A | 4/1994 | Groleau et al. | |
| 5,403,799 A | 4/1995 | Miller et al. | |
| 5,403,809 A | 4/1995 | Miller et al. | |
| 5,512,069 A | 4/1996 | Holland | |
| 5,961,687 A | 10/1999 | Joshi et al. | |
| 6,107,067 A | 8/2000 | Miller et al. | |
| 6,174,837 B1 | 1/2001 | Joshi et al. | |
| 6,329,320 B1 | 12/2001 | Joshi et al. | |
| 7,214,509 B2 | 5/2007 | Schnoor et al. | |
| 7,435,878 B2 | 10/2008 | Holland | |
| 8,153,118 B2 | 4/2012 | Holland et al. | |
| 8,181,388 B2 | 5/2012 | Berger | |
| 8,778,660 B2 | 7/2014 | Holland et al. | |
| 9,181,541 B2 | 11/2015 | Bogosian | |
| 9,845,462 B2 | 12/2017 | Bogosian | |
| 10,098,353 B2 * | 10/2018 | Breakfield | A01N 63/20 |
| 10,111,438 B2 | 10/2018 | Floro et al. | |
| 10,212,939 B2 | 2/2019 | Floro et al. | |
| 10,287,544 B2 | 5/2019 | Bogosian | |
| 10,368,547 B2 | 8/2019 | Floro et al. | |
| 10,448,645 B2 * | 10/2019 | Breakfield | A01N 63/20 |
| 10,450,556 B2 | 10/2019 | Bogosian | |
| 10,716,307 B2 * | 7/2020 | Breakfield | A01N 63/20 |
| 10,993,443 B2 * | 5/2021 | Jones | A01N 63/00 |
| 2001/0001095 A1 | 5/2001 | Joshi et al. | |
| 2003/0211082 A1 | 11/2003 | Holland | |
| 2005/0096225 A1 | 5/2005 | Johnson | |
| 2006/0059581 A1 | 3/2006 | Spencer et al. | |
| 2006/0150488 A1 | 7/2006 | Pearce et al. | |
| 2006/0228797 A1 | 10/2006 | Holland et al. | |
| 2007/0074451 A1 | 4/2007 | Pearce et al. | |
| 2010/0093538 A1 | 4/2010 | Gnanamanickam | |
| 2011/0028321 A1 | 2/2011 | Tani et al. | |
| 2013/0324407 A1 | 12/2013 | Bogosian | |
| 2015/0337256 A1 | 11/2015 | Bogosian | |
| 2016/0046925 A1 | 2/2016 | Bogosian | |
| 2016/0073641 A1 | 3/2016 | Allen et al. | |
| 2016/0120188 A1 | 5/2016 | Bogosian | |
| 2016/0295868 A1 | 10/2016 | Jones et al. | |
| 2016/0302424 A1 | 10/2016 | DiDonato et al. | |
| 2016/0302425 A1 | 10/2016 | DiDonato et al. | |
| 2017/0086464 A1 | 3/2017 | Floro et al. | |
| 2017/0135352 A1 | 5/2017 | Breakfield et al. | |
| 2017/0164618 A1 | 6/2017 | Breakfield et al. | |
| 2017/0238553 A1 | 8/2017 | Jones et al. | |

(Continued)

FOREIGN PATENT DOCUMENTS

| | | |
|---|---|---|
| CA | 2183275 A1 | 2/1998 |
| CA | 2759990 A1 | 2/1998 |

(Continued)

OTHER PUBLICATIONS

Varriant, Definition, [online]. Marriam-Webster, 2019, [retrieved on Oct. 10, 2019]. Retrieved from the Internet:http://www.merriam-webster.com/dictionary/variant, 3 pages. (Year: 2019).
International Search Report and Written Opinion dated Mar. 2, 2015, issued in PCT Patent Application No. PCT/US2014/068660.
"ATCC Bacteria and Bacteriophages", American Type Culture Collection, 1996, pp. 213-214, 19th Edition.
"ATCC Preservation Methods: Freezing and Freeze-Drying", 1991, pp. 5-13, 2nd Edition, ATCC.
Abanda-Nkpwatt et al., "Molecular Interaction Between Methylobacterium Extorquens and Seedlings: Growth Promotion, Methanol Consumption, and Localization of the Methanol Emission Site", Journal of Experimental Botany, Oct. 16, 2006, vol. 57 No. 15, pp. 4025-4032.
Adams, "The Principles of Freeze-Drying", Methods in Molecular Biology, 2007, pp. 15-38, vol. 368.

(Continued)

*Primary Examiner* — Alton N Pryor
(74) *Attorney, Agent, or Firm* — Stinson LLP

(57) ABSTRACT

The present invention provides yield or early vigor enhancing compositions comprising *Methylobacterium* sp., methods for improving soybean yield, and methods of making the compositions. Also provided are isolated soybean yield or early vigor enhancing *Methylobacterium* sp.

16 Claims, No Drawings

(56) References Cited

U.S. PATENT DOCUMENTS

| | | | |
|---|---|---|---|
| 2018/0142230 A1 | 5/2018 | Bogosian |
| 2018/0295841 A1 | 10/2018 | Rioux |
| 2019/0008159 A1 | 1/2019 | Breakfield et al. |
| 2019/0021334 A1 | 1/2019 | DiDonato Floro et al. |
| 2019/0116803 A1 | 4/2019 | DiDonato Floro et al. |
| 2019/0241865 A1 | 8/2019 | Bogosian |
| 2019/0297895 A1 | 10/2019 | Floro et al. |
| 2019/0364905 A1 | 12/2019 | Rioux et al. |
| 2020/0315181 A1 | 10/2020 | Breakfield et al. |
| 2020/0318095 A1 | 10/2020 | Bogosian |

FOREIGN PATENT DOCUMENTS

| | | |
|---|---|---|
| CN | 101028008 A | 9/2007 |
| EP | 0140723 A1 | 5/1985 |
| EP | 2390345 A1 | 11/2011 |
| KR | 100755509 B1 | 9/2007 |
| KR | 20070106867 A | 11/2007 |
| KR | 20070106868 A | 11/2007 |
| KR | 20070111915 A | 11/2007 |
| KR | 20080097568 A | 11/2008 |
| KR | 100953179 B1 | 4/2010 |
| KR | 10-1195899 B1 | 10/2012 |
| WO | 2000/060052 A1 | 10/2000 |
| WO | 2003046226 A1 | 6/2003 |
| WO | 2012012671 A2 | 1/2012 |
| WO | 2012140207 A2 | 10/2012 |
| WO | 2012140212 A2 | 10/2012 |
| WO | 2013141815 A1 | 9/2013 |
| WO | 2013181610 A1 | 12/2013 |
| WO | 2014194189 A1 | 12/2014 |
| WO | 2015/085117 A1 | 6/2015 |
| WO | 2015085063 A1 | 6/2015 |
| WO | 2015085115 A1 | 6/2015 |
| WO | 2015142393 A1 | 9/2015 |
| WO | 2016069564 A1 | 5/2016 |
| WO | 2016201284 A2 | 12/2016 |
| WO | 2018106899 A1 | 6/2018 |

OTHER PUBLICATIONS

Balachandar et al., "Genetic and Metabolic Diversity of Pink-Pigmented Facultative Methylotrophs in Phyllosphere of Tropical Plants", Brazilian Journal of Microbiology, 2008, pp. 68-73, vol. 39.

Chitra et al., "Multigeneric PGPR Coaggregates: A Novel Bioformulation and Delivery System for the Induction of Systemic Resistance in Rice—Xanthomonas Oryzae Pathosystem Under Lowland Condition", Golden Research Thoughts, Oct. 2013, pp. 1-10, vol. 3, No. 4.

Chitra et al.,"Multigeneric Microbial Coaggregates-Effect of Different Bioformulations of PGPR Cells on the Enhancement of PGPR Characteristics and Biocontrol Against *Xanthomonas oryzae* pv. *oryzae* in Rice Grown Under Lowland Condition", Journal of Applicable Chemistry, 2013, pp. 1132-1140, vol. 2, No. 5.

Corpe et al., "Ecology of the Methylotrophic Bacteria on Living Leaf Surfaces", FEMS Microbiology Ecology, 1989, vol. 62, pp. 243-250.

Corpe et al., "Methanol-Utilizing Bacteria Associated with Green Plants", Developments in Industrial Microbiology, 1982, pp. 483-493, vol. 23.

De Valdez et al., "Effect of Drying Medium on Residual Moisture Content and Viability of Freeze-Dried Lactic Acid Bacteria", Applied and Environmental Microbiology, Feb. 1985, pp. 413-415, vol. 49, No. 2.

GenBank entry FP103042, Nov. 5, 2010, retreived on Jan. 5, 2016 from http://www.ncbi.nlm.nih.gov/nuccore/254265931?sat=18 &satkey-27964264.

Gomathy et al., "Impact of Biofertigation of Azophosmet on Cotton Yield under Dripirrigation", Research Journal of Agriculture and Biological Sciences, 2008, pp. 695-699, vol. 4, No. 6.

Green, "Methylobacterium", Prokaryotes, 2006, vol. 5, Chapter 3.1.13, pp. 257-265.

Holland, "Methylobacterium and Plants", Recent Research Developments in Plant Physiology, 1997, pp. 207-213, vol. 1.

http://www.bacterio.net/methylobacterium.html, downloaded on Oct. 12, 2017, 12 pages.

International Search Report and Written Opinion dated Apr. 28, 2015, issued in PCT Patent Application No. PCT/US2014/068558.

International Search Report and Written Opinion dated Feb. 16, 2016, issued in PCT Patent Application No. PCT/US2015/057521.

International Search Report and Written Opinion dated Feb. 20, 2015, issued in PCT Patent Application No. PCT/US2014/068657.

International Search Report and Written Opinion dated Feb. 23, 2015, issued in PCT Patent Application No. PCT/US2014/068663.

International Search Report and Written Opinion for PCT/US2013/043722 dated Aug. 23, 2013.

Jiang et al., "Methanotrophs: Multifunctional Bacteria with Promising Applications in Environmental Bioengineering", Biochemical Engineering Journal, May 15, 2010, pp. 277-288, vol. 49 No. 3.

Joe et al., "Development of Alginate-Based Aggregate Inoculants of *Methylobacterium* sp. and Azospirillum brasilence Tested Under In Vitro Conditions to Promote Plant Growth", Journal of Applied Microbiology, Nov. 22, 2013, pp. 408-423, vol. 116, Issue 2.

Joe et al., Development of Alginate-Based Aggregate Inoculants of *Methylobacterium* sp. and Azospirillum brasilense Tested Under in vitro Conditions to Promote Plant Growth, Journal of Applied Microbiology, Nov. 2012, pp. 1-46.

Kongkhaem et al., "Silica-Immobilized *Methylobacterium* sp. NP3 and *Acinetobacter* sp. PK1 Degrade High Concentrations of Phenol", Letters in Applied Microbiology, May 2011, pp. 448-455, vol. 52 No. 5.

Leslie et al., "Trehalose and Sucrose Protect Both Membranes and Proteins in Intact Bacteria during Drying", Applied and Environmental Microbiology, Oct. 1995, pp. 3592-3597, vol. 61 No. 10.

Li et al., "2,4,5,-Trichlorophenol Degradation Using a Novel $TiO_2$-Coated Biofilm Carrier: Roles of Adsorption, Photocatalysis, and Biodegradation", Environmental Science & Technology, Aug. 23, 2011, pp. 8359-8367. vol. 45. No. 19.

Lidstrom et al., "Plants in the Pink: Cytokinin Production by Methylbacterium", Journal of Bacteriology, Apr. 2002, p. 1818, vol. 184, No. 7.

Madhaiyan et al., "Growth Promotion and Induction of Systemic Resistance in Rice Cultivar Co-47 (*Oryza sativa* L.) by *Methylobacterium* spp.", Botanical Bulletin of the Academia Sinica, 2004, pp. 315-324, vol. 45.

Madhaiyan et al., "Metal Tolerating Methylotrophic Bacteria Reduces Nickel and Cadmium Toxicity and Promotes Plant Growth of Tomato (*Lycopersicon esculentum* L.)", Chemosphere, May 23, 2007, pp. 220-228, vol. 69.

Madhaiyan et al., "Pink-Pigmented Facultative Methylotrophic Bacteria Accelerate Germination, Growth and Yield of Sugarcane Clone Co86032 (*Saccharum officinarum* L.)", Biology and Fertility of Soils, 2005, pp. 350-358, vol. 41.

Ntsaluba et al., "Studies on Bioflocculant Production by *Methylobacterium* sp. Obi Isolated from a Freshwater Environment in South Africa", African Journal of Microbiology Research, Nov. 16, 2011, pp. 4533-4540, vol. 5 No. 26.

Omer et al., "Plant Colonization by Pink-Pigmented Facultative Methylotrophic Bacteria (PPFMs)", FEMS Microbiology Ecology, Mar. 2004, pp. 319-326, vol. 47 No. 3.

Pacific Ag Research, "Evaluation of Efficacy Using NLS Strains as Biostimulant in Direct Seeded Cool Season Lettuce Approach", Research and Development Project Report, Winter-Summer 2015.

Poorniammal et al., "In Vitro Biocontrol Activity of Methylobacterium Extorquens Against Fungal Pathogens", International Journal of Plant Protection, 2009, pp. 59-62, vol. 2, No. 1.

Rastogi et al., "Leaf Microbiota in an Agroecosystem Spatiotemporal Variation in Bacterial Community Composition on Field-Grown Lettuce", The ISME Journal, Apr. 26, 2012. pp. 1812-1822, vol. 6.

RD4AG Lettuce Field Trial Report dated Jan. 30, 2015.

RD4AG Lettuce Field Trial Report dated May 31, 2015.

Ryu et al., "Plant Growth Substances Produced by *Methylobacterium* spp. and Their Effect on Tomato (*Lycopersicon esculentum* L.) and

(56) References Cited

OTHER PUBLICATIONS

Red Pepper (*Capsicum annuum* L. ) Growth", Journal of Microbiology and Biotechnology, Oct. 2006, pp. 1622-1628, vol. 16, No. 10.
Simoes et al., "Adhesion and Biofilm Formation on Polystyrene by Drinking Water-Isolated Bacteria", Antonie van Leeuwenhoek, Apr. 20, 2010, pp. 317-329, vol. 98 No. 3.
Sundaram et al., "Bioinoculants for Sustainable and Cost Effective Production of High Quality Fibre", TMC Annual Report, TMC-MMI-2.3, 2006, pp. 1-7, Retrieved from the internet, Apr. 2, 2014, http://www.tmc.cicr.org.in/PDF/22.3.pdf.
Sy, A. et al., "Methylotrophic Metabolism Is Advantageous for Methylobacterium extorquens during Colonization of Medicago truncatula under Competitive Conditions", Applied and Environmental Microbiology, 2005, pp. 7245-7252, vol. 71, No. 11.
Tani et al., "Methylobacterium Species Promoting Rice and Barley Growth and Interaction Specificity Revealed with Whole-Cell Matrix-Assisted Laser Desorption / Ionization-Time-of-Flight Mass Spectrometry (MALDI-TOF/MS) Analysis", PLOS ONE, Jun. 8, 2015, 15 pages.
Vaidehi et al., "Adhesion of Methylobacterium Cells to Rice Roots: Active Metabolism of Miropartner Determines the Degree of Adsorption Level at Rhizosphere", International Journal of Research in Pure and Applied Microbiology, 2012, pp. 54-58, vol. 2, No. 4.
Verhoef et al., "*Methylobacterium* sp. Isolated from a Finnish Paper Machine Produces Highly Pyruvated Galactan Exopolysaccharide", Carbohydrate Research, 2003, pp. 1851-1859, vol. 338.

Vuilleumier et al., "Methylobacterium Genome Sequences: A Reference Blueprint to Investigate Microbial Metabolism of C1 Compounds from Natural and Industrial Sources", Public Library of Science One, May 18, 2009, pp. 1-16; vol. 4, No. 5.
Wessman et al., "Impact of Matrix Properties on the Survival of Freeze-Dried Bacteria", Journal of the Science and Food Agriculture, 2011, pp. 2518-2528, vol. 91.
Terrasym 401 for Soybeans, NewLeaf Symbiotics, 2018, 2 pages.
Dourado et al., "Analysis of 16S rRNA and mxaF Genes Revealing Insights into Mehylobacterium Niche-Specific Plant Association", Genetics and Molecular Biology, 2012, pp. 142-148, vol. 35, No. 1.
Green et al., "Review of the Genus *Methylobacterium* and Closely Related Organisms: A Proposal that some *Methylobacterium* Species be Reclassified into a New Genus, *Methylorubrum* gen. nov.", International Journal of Systematic and Evolutionary Microbiology, 2018, pp. 2727-2748, vol. 68.
Tani et al., "High-Throughput Identification and Screening of Novel *Methylobacterium* Species Using Whole-Cell MALDI-TOF/MS Analysis", Plos One, Jul. 2012, 13 pages, vol. 7, No. 7.
Knief et al., "Competitiveness of Diverse Methylobacterium Strains in the Phyllosphere of *Arabidopsis thaliana* and Identification of Representative Models, Including M. Extorquens PA1", Microb Ecol, 2010, pp. 440-452, vol. 60.
Tani, et al., Practical Application of Methanol-Mediated Mutualistic Symbiosis between *Methylobacterium* Species and a Roof Greening Moss, *Racomitrium japonicum* TPLOS One, Mar. 2012, vol. 7(3) e33800, 9 pages.

\* cited by examiner

METHODS AND COMPOSITIONS FOR IMPROVING SOYBEAN YIELD

CROSS-REFERENCE TO RELATED APPLICATIONS

This application is a division of U.S. patent application Ser. No. 15/100,947, filed Jun. 1, 2016, which is the U.S. national stage of International Application No. PCT/US2014/068660, filed Dec. 4, 2014, which claims the benefit of U.S. Patent Application Ser. No. 61/911,698, filed Dec. 4, 2013, each of which are incorporated herein by reference in its entirety.

BACKGROUND

One-carbon organic compounds such as methane and methanol are found extensively in nature, and are utilized as carbon sources by bacteria classified as methanotrophs and methylotrophs. Methanotrophic bacteria include species in the genera *Methylobacter, Methylomonas, Methylomicrobium, Methylococcus, Methylosinus, Methylocystis, Methylosphaera, Methylocaldum*, and *Methylocella* (Lidstrom, 2006). Methanotrophs possess the enzyme methane monooxygenase, that incorporates an atom of oxygen from 02 into methane, forming methanol. All methanotrophs are obligate one-carbon utilizers that are unable to use compounds containing carbon-carbon bonds. Methylotrophs, on the other hand, can also utilize more complex organic compounds, such as organic acids, higher alcohols, sugars, and the like. Thus, methylotrophic bacteria are facultative methylotrophs. Methylotrophic bacteria include species in the genera *Methylobacterium, Hyphomicrobium, Methylophilus, Methylobacillus*, Methylophaga, Aminobacter, Methylorhabdus, Methylopila, Methylosulfonomonas, Marinosulfonomonas, *Paracoccus*, Xanthobacter, Ancylobacter (also known as Microcyclus), *Thiobacillus, Rhodopseudomonas, Rhodobacter, Acetobacter, Bacillus, Mycobacterium*, Arthobacter, and *Nocardia* (Lidstrom, 2006).

Most methylotrophic bacteria of the genus *Methylobacterium* are pink-pigmented. They are conventionally referred to as PPFM bacteria, being pink-pigmented facultative methylotrophs. Green (2005, 2006) identified twelve validated species in the genus *Methylobacterium*, specifically *M. aminovorans, M. chloromethanicum, M dichloromethanicum, M extorquens, M fujisawaense, M mesophilicum, M. organophilum, M. radiotolerans, M. rhodesianum, M rhodinum, M thiocyanatum*, and *M. zatmanii*. However, *M. nidulans* is a nitrogen-fixing *Methylobacterium* that is not a PPFM (Sy et al., 2001). *Methylobacterium* are ubiquitous in nature, being found in soil, dust, fresh water, sediments, and leaf surfaces, as well as in industrial and clinical environments (Green, 2006).

SUMMARY

Provided herein are isolated yield enhancing *Methylobacterium* sp., compositions comprising yield enhancing *Methylobacterium* sp., methods of using the compositions to increase yield of soybean plants, plant parts, and soybean plants derived therefrom, and methods of making the compositions. Such yield enhancing *Methylobacterium* sp. are in certain instances referred to herein as simply "*Methylobacterium*". In certain embodiments, yield enhancing *Methylobacterium* sp. can be distinguished from other yield neutral or yield negative *Methylobacterium* by assaying the *Methylobacterium* sp. for improved yield in a controlled environment (i.e. a growth chamber or greenhouse) or in a field test in comparison to untreated control plants or in comparison to control plants treated yield neutral or yield negative *Methylobacterium*, and combinations thereof. In certain embodiments, the yield enhancing *Methylobacterium* sp. is a *Methylobacterium* isolate selected from the group consisting of ISO02 (NRRL B-50930), ISO03 (NRRL B-50931), ISO09 (NRRL B-50937), ISO10 (NRRL B-50938), and derivatives thereof.

Methods for improving soybean plant yield that comprise applying a composition comprising a *Methylobacterium* sp. to a soybean seed, or to a soybean plant or part thereof at a first time of about the VE to about the V4 stage of development; and/or at a second time about the V5 to about the R6 stage of development are provided herein. In certain embodiments, the composition that is applied comprises: (a) a solid substance with the *Methylobacterium* grown thereon and adhered thereto; or (b) an emulsion having the *Methylobacterium* grown therein. Also provided are methods for improving soybean plant yield that comprise: (a) applying a composition comprising a *Methylobacterium* sp. to a soybean seed, or to a soybean plant or part thereof at a first time of about the VE to about the V4 stage of development; and/or at a second time about the V5 to about the R6 stage of development; wherein the composition comprises: (i) a solid substance with the *Methylobacterium* grown thereon and adhered thereto; (ii) an emulsion having the *Methylobacterium* grown therein; or (iii) a *Methylobacterium* isolate ISO02 (NRRL B-50930), ISO03 (NRRL B-50931), ISO09 (NRRL B-50937), ISO10 (NRRL B-50938), or a derivative thereof and an agriculturally acceptable adjuvant, excipient, or combination thereof, and, (b) growing the soybean plant to maturity, thereby improving yield of the soybean plant. In certain embodiments, the solid substance with the *Methylobacterium* grown thereon and adhered thereto is provided in a liquid or an emulsion. In certain embodiments, the methods further comprise growing the soybean plant to maturity. In certain embodiments, the composition is applied in the first time at the VE to V2 stage of development, at the V2 to the V3 stage of development, at the V3 to V4 stage of development, or at about the V3 stage of development. In certain embodiments, the composition is applied at the V6 to the R1 stage of development, at the R1 to R2 stage of development, or at about the R1 stage of development. In certain embodiments, the composition comprises a solid substance with the *Methylobacterium* grown thereon and adhered thereto. In certain embodiments, the composition is a solid composition that contains the *Methylobacterium* sp. at a titer of about $1 \times 10^6$ CFU/gm to about $1 \times 10^{14}$ CFU/gm. In certain embodiments, the composition is a liquid composition containing the solid substance or an emulsion that contains the *Methylobacterium* sp at a titer of about $1 \times 10^6$ CFU/mL to about $1 \times 10^{11}$ CFU/mL. In certain embodiments, the *Methylobacterium* sp. is ISO02 (NRRL B-50930), ISO03 (NRRL B-50931), ISO09 (NRRL B-50937), ISO10 (NRRL B-50938), or a derivative thereof. In certain embodiments, the *Methylobacterium* sp. is ISO09 (NRRL B-50937), ISO10 (NRRL B-50938), or a derivative thereof. In certain embodiments, the composition comprises the solid substance or the emulsion and wherein the *Methylobacterium* sp. is ISO02 (NRRL B-50930), ISO03 (NRRL B-50931), ISO09 (NRRL B-50937), ISO10 (NRRL B-50938), or a derivative thereof. In certain embodiments, the *Methylobacterium* sp. is a glyphosate resistant or glufosinate resistant derivative of ISO02 (NRRL B-50930), ISO03 (NRRL B-50931), ISO09 (NRRL B-50937), or ISO10 (NRRL B-50938). In certain embodiments, the *Meth*-

*ylobacterium* sp. is selected for glyphosate resistance, the soybean plant is a glyphosate tolerant soybean plant, and a formulation containing glyphosate is also applied at about the V2 to about the V4 stage of soybean plant development. In certain embodiments, the *Methylobacterium* sp. is ISO09 (NRRL B-50937), ISO10 (NRRL B-50938), or a derivative thereof. In certain embodiments of any of the aforementioned methods, the applied composition coats or partially coats the soybean seed or the soybean plant or a part thereof. In certain embodiments of any of the aforementioned methods, the composition is applied to foliage of the soybean plant. In certain embodiments, the *Methylobacterium* sp. is selected for glyphosate resistance. In certain embodiments, the soybean plant is a glyphosate tolerant soybean plant and a formulation containing glyphosate is also applied at about the V2 to about the V4 stage of soybean plant development. In certain embodiments of any of the aforementioned methods, the methods can further comprise the step of harvesting seed from the mature soybean plant. In certain embodiments, the yield of harvested seed is increased in comparison to yield of harvested seed obtained from a control soybean plant that did not receive an application of the *Methylobacterium* sp.

Also provided are soybean plants or soybean plant parts that are coated or partially coated with a composition comprising a *Methylobacterium* sp. In certain embodiments, the soybean plant or soybean plant part is coated or partially coated with a composition comprising a *Methylobacterium* sp. isolate selected from the group consisting of ISO02 (NRRL B-50930), ISO03 (NRRL B-50931), ISO09 (NRRL B-50937), ISO10 (NRRL B-50938), and derivatives thereof. In certain embodiments, the composition comprises: (i) a solid substance with the *Methylobacterium* grown thereon and adhered thereto; or (ii) an emulsion having the *Methylobacterium* grown therein. In certain embodiments, the composition comprises the *Methylobacterium* sp. at a titer of about $1\times10^6$ CFU/gm to about $1\times10^{14}$ CFU/gm for a solid composition or at a titer of about $1\times10^6$ CFU/mL to about $1\times10^{11}$ CFU/mL for a liquid composition containing the solid substance or for the emulsion. In certain embodiments, the *Methylobacterium* sp. is *Methylobacterium* isolate is ISO09 (NRRL B-50937), ISO10 (NRRL B-50938), or a derivative thereof. In certain embodiments of any of the aforementioned compositions, the soybean plant part is selected from the group consisting of a seed, a stem, a flower, a leaf, a petiole, a pod, and an axillary bud.

Also provided are methods for improving soybean plant yield that comprise: (i) applying a composition comprising a *Methylobacterium* sp. to a soybean seed or to a soybean plant at about the VE to about the V5 stage of soybean plant development, wherein the composition comprises a solid substance with the *Methylobacterium* grown thereon and adhered thereto or an emulsion having the *Methylobacterium* grown therein; and, (ii) growing the soybean plant to maturity, thereby improving yield of the soybean plant. In certain embodiments, methods for improving soybean plant yield that comprise: (a) applying a composition comprising a *Methylobacterium* sp. to a soybean seed or to a soybean plant at about the VE to about the V5 stage of soybean plant development, wherein the composition comprises: (i) a solid substance with the *Methylobacterium* grown thereon and adhered thereto; (ii) an emulsion having the *Methylobacterium* grown therein; or (iii) a *Methylobacterium* isolate ISO02 (NRRL B-50930), ISO03 (NRRL B-50931), ISO09 (NRRL B-50937), ISO10 (NRRL B-50938), or a derivative thereof and an agriculturally acceptable adjuvant, excipient, or combination thereof; and, (b) growing the soybean plant to maturity, thereby improving yield of the soybean plant are provided. In certain embodiments, the composition is applied at about the V2 to about the V3 stage of development, about the V3 to about the V4 stage of development, or about the V3 stage of development. In certain embodiments, the solid substance with the *Methylobacterium* grown thereon and adhered thereto is provided in a liquid or an emulsion. In certain embodiments, the composition comprises the *Methylobacterium* sp. at a titer of about $1\times10^6$ CFU/gm to about $1\times10^{14}$ CFU/gm for a solid composition or at a titer of about $1\times10^6$ CFU/mL to about $1\times10^{11}$ CFU/mL for a liquid composition containing the solid substance or for the emulsion. In certain embodiments, the *Methylobacterium* sp. is ISO02 (NRRL B-50930), ISO03 (NRRL B-50931), ISO09 (NRRL B-50937), ISO10 (NRRL B-50938), or a derivative thereof. In certain embodiments, the *Methylobacterium* sp. is *Methylobacterium* isolate ISO09 (NRRL B-50937), ISO10 (NRRL B-50938), or a derivative thereof. In certain embodiments, the composition comprises the solid substance or the emulsion and the *Methylobacterium* sp. is selected from the group consisting of ISO02 (NRRL B-50930), ISO03 (NRRL B-50931), ISO09 (NRRL B-50937, ISO10 (NRRL B-50938), and derivatives thereof. In certain embodiments of any of the aforementioned methods, the derivative of the *Methylobacterium* isolate is selected for glyphosate resistance. In certain embodiments, the soybean plant is a glyphosate tolerant soybean plant and a formulation containing glyphosate is also applied at about the V2 to about the V4 stage of soybean plant development. In certain embodiments of any of the aforementioned methods, the method further comprises harvesting seed from the mature soybean plant. In certain embodiments of any of the aforementioned methods, the yield of harvested seed is increased in comparison to yield of harvested seed obtained from a control soybean plant that did not receive an application of the *Methylobacterium* sp.

Also provided herein is an isolated *Methylobacterium* sp. strain ISO02 (NRRL B-50930), ISO03 (NRRL B-50931), ISO09 (NRRL B-50937, ISO10 (NRRL B-50938), or derivative thereof. Compositions comprising *Methylobacterium* sp. strain ISO02 (NRRL B-50930), ISO03 (NRRL B-50931), ISO09 (NRRL B-50937, ISO10 (NRRL B-50938), or derivative thereof are also provided.

Also provided herein are methods for improving soybean plant early vigor that comprise: (a) applying a composition comprising a *Methylobacterium* sp. to a soybean seed or to a soybean plant at about the VE to about the V3 stage of soybean plant development, wherein the composition comprises: (i) a solid substance with the *Methylobacterium* grown thereon and adhered thereto; (ii) an emulsion having the *Methylobacterium* grown therein; or (iii) a *Methylobacterium* isolate ISO02 (NRRL B-50930), ISO03 (NRRL B-50931), ISO09 (NRRL B-50937), ISO10 (NRRL B-50938), or a derivative thereof and an agriculturally acceptable adjuvant, excipient, or combination thereof; and, (b) growing a soybean plant from the seed or the soybean plant to the V3 to V6 stage of development, thereby improving early vigor of the soybean plant. In certain embodiments of the methods, the composition is applied at about the VE to about the V2 stage of development, about the VE to about the V1 stage of development, or VE stage of development. In certain embodiments of the methods, the composition comprises the *Methylobacterium* sp. at a titer of about $1\times10^6$ CFU/gm to about $1\times10^{14}$ CFU/gm for a solid composition or at a titer of about $1\times10^6$ CFU/mL to about $1\times10^{11}$ CFU/mL for a liquid composition containing the solid substance or for the emulsion. In certain embodiments of the methods, the composition comprises the solid or the emulsion and the *Methylobacterium* sp. is *Methylobacterium* isolate ISO02 (NRRL B-50930), ISO03 (NRRL B-50931), ISO09 (NRRL B-50937, ISO10 (NRRL B-50938), or a derivative thereof. In certain embodiments of the methods, the composition comprises the solid or the emulsion and the *Methylobacterium* sp. is *Methylobacterium* isolate ISO09 (NRRL B-50937, ISO10 (NRRL B-50938), or a derivative thereof. In certain embodiments of the methods, the derivative thereof is selected for resistance to a bacteriocidal agent. In certain embodiments of the methods, the *Methylobacterium* isolate is selected for glyphosate resistance or for glufosinate resistance. In certain embodiments of the methods, the soybean plant is a glyphosate tolerant soybean plant and a formulation containing glyphosate is also applied at about the V2 to about the V4 stage of soybean plant development. In certain embodiments of any of the aforementioned methods, the vigor of the soybean plant in step (b) is increased in comparison to vigor of a control soybean plant that did not receive an application of the *Methylobacterium* sp. In certain embodiments of any of the aforementioned methods, increased vigor comprises increased height, increased leaf area, increased chlorophyll content, increased stalk diameter, an advanced vegetative stage on a V1-V6 scale, root volume, root length, number of root tips, and combinations thereof. In certain embodiments of the aforementioned methods, the applied composition coats or partially coats the soybean seed or the soybean plant or a part thereof.

DESCRIPTION

Definitions

As used herein, the phrases "adhered thereto" and "adherent" refer to *Methylobacterium* that are associated with a solid substance by growing, or having been grown, on a solid substance.

As used herein, the phrase "agriculturally acceptable adjuvant" refers to a substance that enhances the performance of an active agent in a composition for treatment of plants and/or plant parts. In certain compositions, an active agent can comprise a mono-culture or co-culture of *Methylobacterium*.

As used herein, the phrase "agriculturally acceptable excipient" refers to an essentially inert substance that can be used as a diluent and/or carrier for an active agent in a composition for treatment of plants and/or plant parts. In certain compositions, an active agent can comprise a mono-culture or co-culture of *Methylobacterium*.

As used herein, the term "*Methylobacterium*" refers to bacteria that are facultative methylotrophs of the genus *Methylobacterium*. The term *Methylobacterium*, as used herein, thus does not encompass includes species in the genera *Methylobacter, Methylomonas, Methylomicrobium, Methylococcus, Methylosinus, Methylocystis, Methylosphaera, Methylocaldum*, and *Methylocella*, which are obligate methanotrophs.

As used herein, the phrase "control plant" refers to a plant that had not received treatment with a yield or early vigor enhancing *Methylobacterium* or composition comprising the same at either the seed or any subsequent stage of the control plant's development. In certain embodiments, a control plant can be a plant that was treated with a yield neutral *Methylobacterium* sp.

As used herein, the phrase "co-culture of *Methylobacterium*" refers to a *Methylobacterium* culture comprising at least two strains of *Methylobacterium* or at least two species of *Methylobacterium*.

As used herein, the phrase "contaminating microorganism" refers to microorganisms in a culture, fermentation broth, fermentation broth product, or composition that were not identified prior to introduction into the culture, fermentation broth, fermentation broth product, or composition.

As used herein, the phrase "derivatives thereof", when used in the context of a *Methylobacterium* isolate, refers to any strain that is obtained from the *Methylobacterium* isolate. Derivatives of a *Methylobacterium* isolate include, but are not limited to, variants of the strain obtained by selection, variants of the strain selected by mutagenesis and selection, and a genetically transformed strain obtained from the *Methylobacterium* isolate.

As used herein, the phrase "early soybean vigor" or "early vigor", when used in the context of apply compositions containing *Methylobacterium* to soybean seed, plants or parts of plants, refers to any growth characteristic of a soybean plant in the V3 to V6 stage of development that is indicative of improved growth in comparison to an untreated soybean plant. Such growth characteristics can include, but are not limited to, increased height, increased leaf area, increased chlorophyll content, increased stalk diameter, an advanced vegetative stage on a V1-V6 scale, increased root volume, increased root length, increased number of root tips, and combinations thereof.

As used herein, the term "emulsion" refers to a colloidal mixture of two immiscible liquids wherein one liquid is the continuous phase and the other liquid is the dispersed phase. In certain embodiments, the continuous phase is an aqueous liquid and the dispersed phase is liquid that is not miscible, or partially miscible, in the aqueous liquid.

As used herein, the phrase "essentially free of contaminating microorganisms" refers to a culture, fermentation broth, fermentation product, or composition where at least about 95% of the microorganisms present by amount or type in the culture, fermentation broth, fermentation product, or composition are the desired *Methylobacterium* or other desired microorganisms of pre-determined identity.

As used herein, the phrase "inanimate solid substance" refers to a substance which is insoluble or partially soluble in water or aqueous solutions and which is either non-living or which is not a part of a still-living organism from which it was derived.

As used herein, the phrase "mono-culture of *Methylobacterium*" refers to a *Methylobacterium* culture consisting of a single strain of *Methylobacterium*.

As used herein, the term "peptide" refers to any polypeptide of 50 amino acid residues or less.

As used herein, the term "protein" refers to any polypeptide having 51 or more amino acid residues.

As used herein, a "pesticide" refers to an agent that is insecticidal, fungicidal, nematocidal, bacteriocidal, or any combination thereof.

As used herein, the phrase "bacteriostatic agent" refers to agents that inhibit growth of bacteria but do not kill the bacteria.

As used herein, the phrase "pesticide does not substantially inhibit growth of said *Methylobacterium*" refers to any pesticide that when provided in a composition comprising a fermentation product comprising a solid substance wherein a mono-culture or co-culture of *Methylobacterium* is adhered thereto, results in no more than a 50% inhibition of *Methylobacterium* growth when the composition is applied to a plant or plant part in comparison to a composition lacking the pesticide. In certain embodiments, the pesticide results in no more than a 40%, 20%, 10%, 5%, or 1% inhibition of *Methylobacterium* growth when the composition is applied to a plant or plant part in comparison to a composition lacking the pesticide.

As used herein, the term "PPFM bacteria" refers without limitation to bacterial species in the genus *Methylobacterium* other than *M. nodulans*.

As used herein, the phrase "solid substance" refers to a substance which is insoluble or partially soluble in water or aqueous solutions.

As used herein, the phrase "solid phase that can be suspended therein" refers to a solid substance that can be distributed throughout a liquid by agitation.

As used herein, the term "non-regenerable" refers to either a plant part or processed plant product that cannot be regenerated into a whole plant.

As used herein, the phrase "substantially all of the solid phase is suspended in the liquid phase" refers to media wherein at least 95%, 98%, or 99% of solid substance(s) comprising the solid phase are distributed throughout the liquid by agitation.

As used herein, the phrase "substantially all of the solid phase is not suspended in the liquid phase" refers to media where less than 5%, 2%, or 1% of the solid is in a particulate form that is distributed throughout the media by agitation.

To the extent to which any of the preceding definitions is inconsistent with definitions provided in any patent or non-patent reference incorporated herein by reference, any patent or non-patent reference cited herein, or in any patent or non-patent reference found elsewhere, it is understood that the preceding definition will be used herein.

Yield or Early Vigor Enhancing *Methylobacterium*, Compositions Comprising Yield or Early Vigor Enhancing *Methylobacterium*, Methods of their Use, and Methods of Making Various yield or early vigor enhancing *Methylobacterium* isolates, compositions comprising these *Methylobacterium*, methods of using the compositions to improve soybean plant yield and/or early vigor, and methods of making the compositions are provided herein. Amounts of the compositions that comprise yield enhancing *Methylobacterium* sp. sufficient to provide for improved soybean plant yield can be determined by measuring any or all of changes in yield relative to untreated plants or plant parts. In certain embodiments, yield can be assessed by measuring output of seed on a per unit area basis (i.e. bushels per acre, kilograms per hectare, and the like), where the yield enhancing *Methylobacterium* sp treated plants or plants grown from *Methylobacterium* sp treated seed are grown at about the same density as the control plants. In certain embodiments, yield can be assessed by measuring output on a per plant or per plant part basis (grams of seed per plant, grams of seed per cob, kernels per plant, kernels per cob and the like) of the yield enhancing *Methylobacterium* sp treated plants in comparison to untreated control plants.

Isolated yield or early vigor enhancing *Methylobacterium* sp. are provided herein. In certain embodiments, the *Methylobacterium* is selected from the group consisting of M aminovorans, M. extorquens, M. fujisawaense, M. mesophilicum, M radiotolerans, M rhodesianum, M. nodulans, M. phyllosphaerae, M. thiocyanatum, and M. oryzae. In certain embodiments, *Methylobacterium* is not M. radiotolerans or M. oryzae. In certain embodiments, the yield or early vigor enhancing *Methylobacterium* isolate is selected from the group consisting of ISO02, ISO03, ISO09, ISO10, and derivatives thereof. In certain embodiments, the yield enhancing *Methylobacterium* isolate can enhance yield when applied prior to or during reproductive stages of soybean development and is a selected from the group consisting of ISO09, ISO10, and derivatives thereof. In certain embodiments, the yield or early vigor enhancing *Methylobacterium* isolate can enhance yield or early vigor when applied to a soybean seed or in vegetative stages of soybean development and is selected from the group consisting of ISO02, ISO03, ISO10, and derivatives thereof. In certain embodiments, the yield enhancing *Methylobacterium* provides for at least about 2%, at least about 5%, at least about 10%, or at least about 15% increases in yield of a treated plant or a plant arising from a treated seed in comparison to untreated control plants or plants grown from untreated seeds. In certain embodiments, the yield enhancing *Methylobacterium* provides for at least about 2% or at least about 5% to at least about a 10% or at least about a 20% increases in yield of a treated plant or a plant grown from a treated seed in comparison to untreated control plants or plants arising from untreated seeds.

In certain embodiments, the *Methylobacterium* is not M. radiotolerans or M. oryzae. In certain embodiments, the yield or early vigor enhancing *Methylobacterium* provides for increases in yield or improved early vigor when applied to a seed. In certain embodiments, the yield enhancing *Methylobacterium* provides for increases in yield when applied just prior to or during soybean reproductive stages of development. In certain embodiments of any of the aforementioned compositions, the composition comprises a solid substance wherein a mono-culture or co-culture of *Methylobacterium* is adhered thereto. In certain embodiments where the *Methylobacterium* is adhered to a solid substance, the composition comprises a colloid formed by the solid substance wherein a mono-culture or co-culture of *Methylobacterium* is adhered thereto and a liquid. In certain embodiments, the colloid is a gel. In certain embodiments of certain aforementioned compositions, composition is an emulsion that does not contain a solid substance. In certain embodiments of any of the aforementioned compositions, the yield or early vigor enhancing *Methylobacterium* is selected from the group consisting of ISO02, ISO03, ISO09, ISO10, and derivatives thereof.

In certain embodiments, isolated yield or early vigor enhancing *Methylobacterium* sp. can be identified by treating a plant, a seed, soil in which the plant or a plant arising from the seed are grown, or other plant growth media in which the plant or a plant arising from the seed are grown and assaying for increased yield or improved early vigor.

In certain embodiments, soybean seed or soybeans in the vegetative stages of development are treated with the yield or early vigor enhancing *Methylobacterium* sp. The vegetative stages of soybean are as follows: VE (emergence), VC (cotyledon stage), V1 (first trifoliolate leaf), V2 (second trifoliolate leaf), V3 (third trifoliolate leaf), V4 (fourth trifoliate leaf), up to V(n) (nth trifoliolate leaf, where the final number of trifoliate leaves depend on the soybean variety and environmental conditions). A description of the soybean vegetative stages can be found on the world wide web (internet) at extension.agron.iastate.edu/soybean/production_growthstages.html and in "Soybean Growth and Development", Pedersen, P., Iowa State University Extension and Outreach publication PM 1945, December 2009). In certain embodiments, the yield or early vigor enhancing *Methylobacterium* sp. are applied at about the VE to about the V4, V5, V6, or Vn stage of development, where n is the number of trifoliate leaves present immediately prior to entering the reproductive stages of development. In certain embodiments, the yield enhancing *Methylobacterium* sp. are applied at about the VC, V1, V2, or V3 to about the V4, V5, V6, or Vn stage of development, where n is the number of trifoliate leaves present immediately prior to entering the reproductive stages of development. In certain embodiments, the yield or early vigor enhancing *Methylobacterium* that is applied to the seed or during the vegetative stage is selected from the group consisting of ISO02, ISO03, ISO10, and derivatives thereof.

In certain embodiments, the yield or early vigor enhancing *Methylobacterium* are applied before, during, or after the application of glyphosate to a transgenic soybean plant that is glyphosate tolerant. Commercially available glyphosate formulations that can be used include, but are not limited to, Roundup Original MAX®, Roundup PowerMAX®, Roundup UltraMax®, or RoundUp WeatherMAX® (Monsanto Co., St. Louis, MO., USA); Touchdown IQ® or Touchdown Total® (Syngenta, Wilmington, Delaware, USA); Glyphomax®, Glyphomax Plus®, or Glyphomax XRT® (Dow Agrosciences LLC, Indianapolis, IN, USA). Soybean plants are typically sprayed with glyphosate at about the V3-V4 vegetative development stage. In certain embodiments, the yield or early vigor enhancing *Methylobacterium* that is applied before, during, or after the application of glyphosate a *Methylobacterium* that is selected for glyphosate resistance. Selections for glyphosate resistant bacteria that have been described (Comai et al., Science 221(4608):370-371) can be adapted for selection of yield or early vigor enhancing *Methylobacterium* that are glyphosate resistant. The selection and use of glyphosate resistant yield or early vigor enhancing *Methylobacterium* from mutagenized or other populations of *Methylobacterium* such as ISO02, ISO03, ISO09, and ISO10 is provided herein.

In certain embodiments, soybean seed or soybeans in the late vegetative stages to reproductive stages of development are treated with the yield enhancing *Methylobacterium* sp. The late vegetative stages of soybean are the V5 or V6, to V(n) (nth trifoliolate leaf, where the final number of trifoliate leaves depend on the soybean variety and environmental conditions) stages. The reproductive stages of soybean development are: R1 (beginning flowering—at least one flower on any node); R2 (full flowering—an open flower at one of the two uppermost nodes); R3 (beginning pod-pods are 5 mm at one of the four uppermost nodes); R4 (full pod-pods at 2 cm at one of the four uppermost nodes); R5 (Beginning seed-seed is 3 mm long in the pod at one of the four uppermost nodes on the main stem); R6 (full seed-pod containing a green seed that fills the pod capacity at one of the four uppermost nodes on the main stem); R7 (beginning maturity-one normal pod on the main stem has reached its mature pod color); and R8 (full maturity-95% of the pods have reached their full mature color. A description of the soybean reproductive and vegetative stages can be found on the world wide web (internet) at extension.agron.iastate.edu/soybean/production_growthstages.html and in "Soybean Growth and Development", Pedersen, P., Iowa State University Extension and Outreach publication PM 1945, December 2009). In certain embodiments, the yield enhancing *Methylobacterium* sp. are applied at about V5, V6, or Vn stage of development, where n is the number of trifoliate leaves present immediately prior to entering the reproductive stages of development, to about the R2, R3, R4, R5, or R6 stage of development. In certain embodiments, the yield enhancing *Methylobacterium* sp. are applied at about the V5, V6, or Vn stage of development to about the R2, R3, or R4 stage of development. In certain embodiments, the yield enhancing *Methylobacterium* that is applied to late vegetative or reproductive stage is selected from the group consisting of ISO09 and ISO10.

Various *Methylobacterium* sp. isolates provided herein are disclosed in Table 1.

TABLE 1

*Methylobacterium* sp. isolates

| ISOLATE No. | NLS No. | USDA ARS NRRL No.[1] |
|---|---|---|
| ISO01 | NLS0046 | NRRL B-50929 |
| ISO02 | NLS0020 | NRRL B-50930 |
| ISO03 | NLS0017 | NRRL B-50931 |
| ISO04 | NLS0042 | NRRL B-50932 |
| ISO05 | NLS0089 | NRRL B-50933 |
| ISO06 | NLS0068 | NRRL B-50934 |
| ISO07 | NLS0065 | NRRL B-50935 |
| ISO08 | NLS0069 | NRRL B-50936 |
| ISO09 | NLS0062 | NRRL B-50937 |
| ISO10 | NLS0064 | NRRL B-50938 |
| ISO11 | NLS0021 | NRRL B-50939 |
| ISO12 | NLS0066 | NRRL B-50940 |
| ISO13 | NLS0037 | NRRL B-50941 |
| ISO14 | NLS0038 | NRRL B-50942 |

[1] Deposit number for strain deposited with the AGRICULTURAL RESEARCH SERVICE CULTURE COLLECTION (NRRL) of the National Center for Agricultural Utilization Research, Agricultural Research Service, U.S. Department of Agriculture, 1815 North University Street, Peoria, Illinois 61604 U.S.A. under the terms of the Budapest Treaty on the International Recognition of the Deposit of Microorganisms for the Purposes of Patent Procedure. Access to the deposited material will be available during pendency of the patent application making reference to it, to one determined by the Director to be entitled to access under 37 CFR § 1.14 and 35 USC § 122 (see In re Lundak, 227 USPQ 90, 94-95 (Fed. Cir. 1985)(citing 35 U.S.C. 114). Subject to 37 CFR § 1.808(b), all restrictions imposed by the depositor on the availability to the public of the deposited material will be irrevocably removed upon the granting of any patent from this patent application. *Methylobacterium* sp. NRRL B-50929, NRRL B-50930, NRRL B-50931, NRRL B-50932, NRRL B-50933, NRRL B-50934, NRRL B-50935, NRRL B-50936, NRRL B-50937, NRRL B-50938, NRRL B-50939, NRRL B-50940, NRRL B-50941 and NRRL B-50942 were deposited with NRRL on Mar. 12, 2014.

Co-assigned patent applications that disclose additional specific uses of the *Methylobacterium* strains of Table 1 such as: (1) increasing corn yield (U.S. 61/911,780, filed Dec. 4, 2013; and International Application claiming benefit of the same filed on Dec. 4, 2014); (2) improving lettuce cultivation (International Patent Application PCT/US14/68558 filed on Dec. 4, 2014); and (3) improving tomato growth (International Patent Application PCT/US14/68611 filed on Dec. 4, 2014) and are each incorporated herein by reference in their entireties. Specifically incorporated herein by reference in their entireties are the amino acid and genomic nucleic acid sequences of *Methylobacterium* sp. NLS017, NLS020, NLS037, NLS042, NLS065, and NLS066 that are disclosed in International Patent Application PCT/US14/68558 filed on Dec. 4, 2014. Also specifically incorporated herein by reference in their entireties are the amino acid and genomic nucleic acid sequences of NLS017 and NLS066 disclosed in the International Patent Application PCT/US14/68611, filed Dec. 4, 2014. Such amino acid and genomic nucleic acid sequences can be used to identify compositions, plant parts, plant seeds, or processed plant products provided herein that comprise *Methylobacterium* sp. NLSO17 or NLSO20.

Also provided herein are methods for improving soybean yield and/or early vigor that comprise applying any of the aforementioned compositions provided herein to a plant or a plant part in an amount that provides for increased soybean yield in the plant, plant part, or a plant obtained therefrom relative to infection of a control plant, plant part, or plant obtained therefrom that had not received an application of the composition. In certain embodiments, application of the composition provides for at least about 50%, at least about 75%, at least about 85%, or at least about 95% increased soybean yield in the plant, plant part, or a plant derived therefrom relative to infection of the control plant, plant part, or plant obtained therefrom. In certain embodiments, the plant part is selected from the group consisting of a leaf, a stem, a flower, a root, a tuber, and a seed. In certain embodiments, the method further comprises the step of harvesting at least one plant part selected from the group consisting of a leaf, a stem, a flower, a root, a pod, or a seed from the plant or plant part. In certain embodiments of any of the aforementioned methods, the methods further comprise obtaining a processed food or feed composition from the plant or plant part. In certain embodiments, the processed food or feed composition is a meal or a paste. In certain embodiments of any of the aforementioned methods, the yield or early vigor enhancing *Methylobacterium* is selected from the group consisting of ISO02, ISO03, ISO09, ISO10, and derivatives thereof. In certain embodiments where the composition is applied prior to or during the reproductive stages of soybean development, the yield enhancing *Methylobacterium* is ISO09, ISO10, or a derivative thereof. In certain embodiments where the composition is applied to the seed or during the vegetative stages of soybean development, the yield or early vigor enhancing *Methylobacterium* is ISO02, ISO03, ISO10, or a derivative thereof.

Also provided are methods of making the compositions useful for improving soybean yield that comprise combining a yield or early vigor enhancing *Methylobacterium* with an agriculturally acceptable excipient and/or with an agriculturally acceptable adjuvant. In certain embodiments of the methods, the *Methylobacterium* sp., is selected from the group consisting of *M. aminovorans, M. extorquens, M. fujisawaense, M. mesophilicum, M. radiotolerans, M. rhodesianum, M. nodulans, M. phyllosphaerae, M thiocyanatum*, and *M. oryzae*. In certain embodiments of the methods, the *Methylobacterium* is notM. *radiotolerans* or *M. oryzae*. In certain embodiments of the methods, the *Methylobacterium* is adhered to a solid substance. In certain embodiments of the methods, the *Methylobacterium* is adhered to the solid substance is combined with a liquid to form a composition that is a colloid. In certain embodiments of the methods, the colloid is a gel. In certain embodiments of the methods, the *Methylobacterium* adhered to the solid substance is provided by culturing the *Methylobacterium* in the presence of the solid substance. In certain embodiments of the methods, the composition comprises an emulsion. In certain embodiments of the methods, the *Methylobacterium* is provided by culturing the *Methylobacterium* in an emulsion. In certain embodiments of any of the aforementioned methods, the yield or early vigor enhancing *Methylobacterium* is selected from the group consisting of ISO02, ISO03, ISO09, and ISO10. In certain embodiments where the composition is applied prior to or during the reproductive stages of soybean development, the yield enhancing *Methylobacterium* is selected from the group consisting of ISO09 and ISO10. In certain embodiments where the composition is applied to the seed or during the vegetative stages of soybean development, the yield or early vigor enhancing *Methylobacterium* is ISO02, ISO03, and ISO10.

Methods where *Methylobacterium* are cultured in biphasic media comprising a liquid phase and a solid substance have been found to significantly increase the resultant yield of *Methylobacterium* relative to methods where the *Methylobacterium* are cultured in liquid media alone. In certain embodiments, the methods can comprise growing the *Methylobacterium* in liquid media with a particulate solid substance that can be suspended in the liquid by agitation under conditions that provide for *Methylobacterium* growth. In certain embodiments where particulate solid substances are used, at least substantially all of the solid phase can thus be suspended in the liquid phase upon agitation. Such particulate solid substances can comprise materials that are about 1 millimeter or less in length or diameter. In certain embodiments, the degree of agitation is sufficient to provide for uniform distribution of the particulate solid substance in the liquid phase and/or optimal levels of culture aeration. However, in other embodiments provided herein, at least substantially all of the solid phase is not suspended in the liquid phase, or portions of the solid phase are suspended in the liquid phase and portions of the solid phase are not suspended in the liquid phase. Non-particulate solid substances can be used in certain biphasic media where the solid phase is not suspended in the liquid phase. Such non-particulate solid substances include, but are not limited to, materials that are greater than about 1 millimeter in length or diameter. Such particulate and non-particulate solid substances also include, but are not limited to, materials that are porous, fibrous, or otherwise configured to provide for increased surface areas for adherent growth of the *Methylobacterium*. Biphasic media where portions of the solid phase are suspended in the liquid phase and portions of the solid phase are not suspended in the liquid phase can comprise a mixture of particulate and non-particulate solid substances. Such particulate and non-particulate solid substances used in any of the aforementioned biphasic media also include, but are not limited to, materials that are porous, fibrous, or otherwise configured to provide for increased surface areas for adherent growth of the *Methylobacterium*. In certain embodiments, the media comprises a colloid formed by a solid and a liquid phase. A colloid comprising a solid and a liquid can be pre-formed and added to liquid media or can be formed in media containing a solid and a liquid. Colloids comprising a solid and a liquid can be formed by subjecting certain solid substances to a chemical and/or thermal change. In certain embodiments, the colloid is a gel. In certain embodiments, the liquid phase of the media is an emulsion. In certain embodiments, the emulsion comprises an aqueous liquid and a liquid that is not miscible, or only partially miscible, in the aqueous liquid. Liquids that are not miscible, or only partially miscible, in water include, but are not limited to, any of the following: (1) liquids having a miscibility in water that is equal to or less than that of pentanol, hexanol, or heptanol at 25 degrees C.; (2) liquids comprising an alcohol, an aldehyde, a ketone, a fatty acid, a phospholipid, or any combination thereof; (3) alcohols selected from the group consisting of aliphatic alcohols containing at least 5 carbons and sterols; (4) an animal oil, microbial oil, synthetic oil, plant oil, or combination thereof; and/or, (5) a plant oil is selected from the group consisting of soybean, soybean, cotton, peanut, sunflower, olive, flax, coconut, palm, rapeseed, sesame seed, safflower, and combinations thereof. In certain embodiments, the immiscible or partially immiscible liquid can comprises at least about 0.02% to about 20% of the liquid phase by mass. In certain embodiments, the methods can comprise obtaining a biphasic culture media comprising the liquid, the solid, and *Methylobacterium* and incubating the culture under conditions that provide for growth of the *Methylobacterium*. Biphasic culture medias comprising the liquid, the solid, and *Methylobacterium* can be obtained by a variety of methods that include, but are not limited to, any of: (a) inoculating a biphasic media comprising the liquid and the solid substance withMethylobacterium; (b) inoculating the solid substance with *Methylobacterium* and then introducing the solid substance comprising the *Methylobacterium* into the liquid media; (c) inoculating the solid substance with *Methylobacterium*, incubating the *Methylobacterium* on the solid substance, and then introducing the solid substance comprising the *Methylobacterium* into the liquid media; or (d) any combination of (a), (b), or (c). Methods and compositions for growing *Methylobacterium* in biphasic media comprising a liquid and a solid are disclosed in co-assigned U.S. patent application Ser. No. 13/907,161, filed May 31, 2013, which is incorporated herein by reference in its entirety, and in co-assigned International Patent Application PCT/US13/43722, filed May 31, 2013, which is incorporated herein by reference in its entirety.

Methods where *Methylobacterium* are cultured in media comprising an emulsion have also been found to significantly increase the resultant yield of *Methylobacterium* relative to methods where the *Methylobacterium* are cultured in liquid media alone. In certain embodiments, the methods for making the compositions provided herein can comprise growing the yield or early vigor enhancing *Methylobacterium* agent in an emulsion under conditions that provide for *Methylobacterium* growth. Medias comprising the emulsion and yield or early vigor enhancing *Methylobacterium* can be obtained by a variety of methods that include, but are not limited to, any of: (a) inoculating a media comprising the emulsion with *Methylobacterium*; (b) inoculating the aqueous liquid with the *Methylobacterium*, introducing the non-aqueous liquid, and mixing to form an emulsion; (c) inoculating the aqueous liquid with the *Methylobacterium*, introducing the non-aqueous liquid, and mixing to form an emulsion; or (d) any combination of (a), (b), or (c). In certain embodiments, the emulsion comprises an aqueous liquid and a liquid that is not miscible, or only partially miscible, in the aqueous liquid. Non-aqueous liquids that are not miscible, or only partially miscible, in water include, but are not limited to, any of the following: (1) liquids having a miscibility in water that is equal to or less than that of n-pentanol, n-hexanol, or n-heptanol at 25 degrees C.; (2) liquids comprising an alcohol, an aldehyde, a ketone, a fatty acid, a phospholipid, or any combination thereof; (3) alcohols is selected from the group consisting of aliphatic alcohols containing at least 5, 6, or 7 carbons and sterols; (4) an animal oil, microbial oil, synthetic oil, plant oil, or combination thereof; and/or, (5) a plant oil is selected from the group consisting of soybean, soybean, cotton, peanut, sunflower, olive, flax, coconut, palm, rapeseed, sesame seed, safflower, and combinations thereof. In certain embodiments, the immiscible or partially immiscible non-aqueous liquid can comprise at least about 0.02% to about 20% of the emulsion by mass. In certain embodiments, the immiscible or partially immiscible non-aqueous liquid can comprise at least about any of about 0.05%, 0.1%, 0.5%, or 1% to about 3%, 5%, 10%, or 20% of the emulsion by mass.

Methods and compositions for growing *Methylobacterium* in media comprising an emulsion are disclosed in co-assigned International Patent Application PCT/US2014/040218, filed May 30, 2014, which is incorporated herein by reference in its entirety.

In certain embodiments, the fermentation broth, fermentation broth product, or compositions that comprise yield or early vigor enhancing *Methylobacterium* sp. can further comprise one or more introduced microorganisms of pre-determined identity other than *Methylobacterium*. Other microorganisms that can be added include, but are not limited to, microorganisms that are biopesticidal or provide some other benefit when applied to a plant or plant part. Biopesticidal or otherwise beneficial microorganisms thus include, but are not limited to, various *Bacillus* sp., *Pseudomonas* sp., *Coniothyrium* sp., *Pantoea* sp., *Streptomyces* sp., and *Trichoderma* sp. Microbial biopesticides can be a bacterium, fungus, virus, or protozoan. Particularly useful biopesticidal microorganisms include various *Bacillus subtilis*, *Bacillus thuringiensis*, *Bacillus pumilis*, *Pseudomonas syringae*, *Trichoderma harzianum*, *Trichoderma virens*, and *Streptomyces lydicus* strains. Other microorganisms that are added can be genetically engineered or naturally occurring isolates that are available as pure cultures. In certain embodiments, it is anticipated that the bacterial or fungal microorganism can be provided in the fermentation broth, fermentation broth product, or composition in the form of a spore.

In certain embodiments, the liquid culture medium is prepared from inexpensive and readily available components, including, but not limited to, inorganic salts such as potassium phosphate, magnesium sulfate and the like, carbon sources such as glycerol, methanol, glutamic acid, aspartic acid, succinic acid and the like, and amino acid blends such as peptone, tryptone, and the like. Exemplary liquid media that can be used include, but are not limited to, ammonium mineral salts (AMS) medium (Whittenbury et al., 1970), Vogel-Bonner (VB) minimal culture medium (Vogel and Bonner, 1956), and LB broth ("Luria-Bertani Broth").

In general, the solid substance used in the methods and compositions that provide for the efficient growth of *Methylobacterium* can be any suitable solid substance which is insoluble or only partially soluble in water or aqueous solutions. Such suitable solid substances are also non-bacteriocidal or non-bacteriostatic with respect to yield or early vigor enhancing *Methylobacterium* sp. when the solid substances are provided in the liquid culture media. In certain embodiments, such suitable solid substances are also solid substances that are readily obtained in sterile form or rendered sterile. Solid substances used herein can be sterilized by any method that provides for removal of contaminating microorganisms and thus include, but are not limited to, methods such as autoclaving, irradiation, chemical treatment, and any combination thereof. These solid substances include natural substances of animal, plant, microbial, fungal, or mineral origin, manmade substances, or combinations of natural and manmade substances. In certain embodiments, the solid substances are inanimate solid substances. Inanimate solid substances of animal, plant, microbial, or fungal origin can be obtained from animals, plants, microbes, or fungi that are inviable (i.e. no longer living) or that have been rendered inviable. Diatom shells are thus inanimate solid substances when previously associated diatom algae have been removed or otherwise rendered inviable. Since diatom shells are inanimate solid substances, they are not considered to be photosynthetic organisms or photosynthetic microorganisms. In certain embodiments, solid substances include, but are not limited to, sand, silt, soil, clay, ash, charcoal, diatomaceous earth and other similar minerals, ground glass or glass beads, ground ceramic materials, ceramic beads, bentonite, kaolin, talc, perlite, mica, vermiculite, silicas, quartz powder, montmorillonite, and combinations thereof. In certain embodiments, the solid substance can be a polymer or polymeric beads. Polymers that can be used as a solid substance include, but are not limited to, various polysaccharides such as cellulosic polymers and chitinous polymers which are insoluble or only partially soluble in water or aqueous solutions, agar (i.e. galactans), and combinations thereof. In certain embodiments, the solid substance can be an insoluble or only partially soluble salt crystal. Salt crystals that can be used include, but are not limited to, insoluble or only partially soluble carbonates, chromates, sulfites, phosphates, hydroxides, oxides, and sulfides. In certain embodiments, the solid substance can be a microbial cell, fungal cell, microbial spore, or fungal spore. In certain embodiments, the solid substance can be a microbial cell or microbial spore wherein the microbial cell or microbial spore is not a photosynthetic microorganism. In certain embodiments, the microbial cell or microbial spore is not a photosynthetic microorganism, where the photosynthetic microorganism is selected from the group consisting of algae, cyanobacteria, diatoms, *Botryococcus braunii*, *Chlorella*, *Dunaliella tertiolecta*, *Gracilaria*, *Pleurochrysis carterae*, Sargassum, and *Ulva*. In still other embodiments, the solid substance can be an inactivated (i.e. inviable) microbial cell, fungal cell, microbial spore, or fungal spore. In still other embodiments, the solid substance can be a quiescent (i.e. viable but not actively dividing) microbial cell, fungal cell, microbial spore, or fungal spore. In still other embodiments, the solid substance can be cellular debris of microbial origin. In still other embodiments, the solid substance can be particulate matter from any part of a plant. Plant parts that can be used to obtain the solid substance include, but are not limited to, cobs, husks, hulls, leaves, roots, flowers, stems, barks, seeds, and combinations thereof. Products obtained from processed plant parts including, but not limited to, bagasse, wheat bran, soy grits, crushed seed cake, stover, and the like can also be used. Such plant parts, processed plants, and/or processed plant parts can be milled to obtain the solid material in a particulate form that can be used. In certain embodiments, wood or a wood product including, but not limited to, wood pulp, sawdust, shavings, and the like can be used. In certain embodiments, the solid substance can be a particulate matter from an animal(s), including, but not limited to, bone meal, gelatin, ground or powdered shells, hair, macerated hide, and the like.

In certain embodiments, the solid substance is provided in a particulate form that provides for distribution of the solid substance in the culture media. In certain embodiments, the solid substance is comprised of particle of about 2 microns to about 1000 microns in average length or average diameter. In certain embodiments, the solid substance is comprised of particle of about 1 microns to about 1000 microns in average length or average diameter. In certain embodiments, the solid substance is a particle of about 1, 2, 4, 10, 20, or 40 microns to any of about 100, 200, 500, 750, or 1000 microns in average length or average diameter. Desirable characteristics of particles used in the methods and compositions provided herein include suitable wettability such that the particles can be suspended throughout the media upon agitation.

In certain embodiments, the solid substance is provided in the media as a colloid wherein the continuous phase is a liquid and the dispersed phase is the solid. Suitable solids that can be used to form colloids in liquid media used to grow yield or early vigor enhancing *Methylobacterium* sp. include, but are not limited to, various solids that are referred to as hydrocolloids. Such hydrocolloids used in the media, methods and compositions provided herein can be hydrophilic polymers, of plant, animal, microbial, or synthetic origin. Hydrocolloid polymers used in the methods can contain many hydroxyl groups and/or can be polyelectrolytes. Hydrocolloid polymers used in the compositions and methods provided herein include, but are not limited to, agar, alginate, arabinoxylan, carrageenan, carboxymethylcellulose, cellulose, curdlan, gelatin, gellan, β-glucan, guar gum, gum arabic, locust bean gum, pectin, starch, xanthan gum, and mixtures thereof. In certain embodiments, the colloid used in the media, methods, and compositions provided herein can comprise a hydrocolloid polymer and one or more proteins.

In certain embodiments, the solid substance can be a solid substance that provides for adherent growth of the yield or early vigor enhancing *Methylobacterium* sp. on the solid substance. Yield or early vigor enhancing *Methylobacterium* sp. that are adhered to a solid substance are *Methylobacterium* that cannot be substantially removed by simply washing the solid substance with the adherent yield or early vigor enhancing *Methylobacterium* sp. with growth media whereas non-adherent *Methylobacterium* can be substantially removed by washing the solid substance with liquid growth media. In this context, "substantially removed" means that at least about 30%, 40%, 50%, 60%, 70%, or 80% the *Methylobacterium* present are removed when the solid substance is washed with three volumes of liquid growth media. Such washing can be effected by a variety of methods including, but not limited to, decanting liquid from a washed solid phase or passing liquid through a solid phase on a filter that permits flow through of bacteria in the liquid. In certain embodiments, the adherent yield or early vigor enhancing *Methylobacterium* sp. that are associated with the solid can include both *Methylobacterium* that are directly attached to the solid and/or *Methylobacterium* that are indirectly attached to the solid substance. *Methylobacterium* that are indirectly attached to the solid substance include, but are not limited to, *Methylobacterium* that are attached to another *Methylobacterium* or to another microorganism that is attached to the solid substance, *Methylobacterium* that are attached to the solid substance by being attached to another substance that is attached to the solid substance, and the like. In certain embodiments, at least 10%, 20%, 30%, 40%, 50%, 60%, 70%, 80%, 90%, 95%, 98%, 99%, 99.5% or 99.9% of the *Methylobacterium* in the fermentation broth, fermentation broth product, or compositions are *Methylobacterium* that are adhered to the solid substance. In certain embodiments, adherent yield or early vigor enhancing *Methylobacterium* sp. can be present on the surface of the solid substance in the fermentation broth, fermentation broth product, or composition at a density of at least about 1 *Methylobacterium*/20 square micrometers, of at least about 1 *Methylobacterium*/10 square micrometers, of at least about 1 *Methylobacterium*/10 square micrometers, of at least about 1 *Methylobacterium*/5 square micrometers, of at least about 1 *Methylobacterium*/2 square micrometers, or of at least about 1 *Methylobacterium*/square micrometer. In certain embodiments, adherent yield or early vigor enhancing *Methylobacterium* sp. can be present on the surface of the solid substance in the fermentation broth, fermentation broth product, or composition at a density of at least about 1 *Methylobacterium*/20 square micrometers to about 1 *Methylobacterium*/square micrometer, of at least about 1 *Methylobacterium*/10 square micrometers to about 1 *Methylobacterium*/square micrometer, of at least about 1 *Methylobacterium*/10 square micrometers to about 1 *Methylobacterium*/square micrometer, of at least about 1 *Methylobacterium*/5 square micrometers to about 1 *Methylobacterium*/square micrometer, or of at least about 1 *Methylobacterium*/2 square micrometers to about 1 *Methylobacterium*/square micrometer. In certain embodiments, adherent yield or early vigor enhancing *Methylobacterium* sp. can be present on the surface of the solid substance in the fermentation broth, fermentation broth product, or composition at a density of at least about 1 *Methylobacterium*/20 square micrometers to about 1 *Methylobacterium*/2 square micrometers, of at least about 1 *Methylobacterium*/10 square micrometers to about 1 Methylobacteriuml 2 square micrometers, of at least about 1 *Methylobacterium*/10 square micrometers to about 1 Methylobacteriuml 2 square micrometers, or of at least about 1 *Methylobacterium*/5 square micrometers to about 1 *Methylobacterium*/2 square micrometers. Biphasic fermentation broths provided herein can comprise a liquid phase that contains non-adherent *Methylobacterium*. In certain embodiments, titers of non-adherent *Methylobacterium* in the liquid phase can be less than about 100,000, 10,000, or 1,000 CFU/ml. In certain embodiments of any of the aforementioned compositions, the yield or early vigor enhancing *Methylobacterium* is selected from the group consisting of ISO02, ISO03, ISO09, ISO10, and derivatives thereof. In certain embodiments where the composition is applied prior to or during the reproductive stages of soybean development, the yield enhancing *Methylobacterium* is selected from the group consisting of ISO09, ISO10, and derivatives thereof. In certain embodiments where the composition is applied to the seed or during the vegetative stages of soybean development, the yield or early vigor enhancing *Methylobacterium* is ISO02, ISO03, ISO10, or a derivative thereof.

Biphasic culture methods provided can yield fermentation broths with yield or early vigor enhancing *Methylobacterium* sp. at a titer of greater than about $5\times10^8$ colony-forming units per milliliter, at a titer of greater than about $1\times10^9$ colony-forming units per milliliter, at a titer of greater than about $1\times10^{10}$ colony-forming units per milliliter, at a titer of at least about $3\times10^{10}$ colony-forming units per milliliter. In certain embodiments, fermentation broths provided herein can comprise yield or early vigor enhancing *Methylobacterium* sp. at a titer of at least about $5\times10^8$ colony-forming units per milliliter to at least about $3\times10^{10}$ colony-forming units per milliliter, at least about $5\times10^8$ colony-forming units per milliliter to at least about $4\times10^{10}$ colony-forming units per milliliter, or at least about $5\times10^8$ colony-forming units per milliliter to at least about $6\times10^{10}$ colony-forming units per milliliter. In certain embodiments, fermentation broths provided herein can comprise yield or early vigor enhancing *Methylobacterium* sp. at a titer of at least about $1\times10^9$ colony-forming units per milliliter to at least about $3\times10^{10}$ colony-forming units per milliliter, at least about $1\times10^9$ colony-forming units per milliliter to at least about $4\times10^{10}$ colony-forming units per milliliter, or at least about $1\times10^9$ colony-forming units per milliliter to at least about $6\times10^{10}$ colony-forming units per milliliter. In certain embodiments, fermentation broths provided herein will comprise yield or early vigor enhancing *Methylobacterium* sp. at a titer of at least about $1\times10^{10}$ colony-forming units per milliliter to at least about $3\times10^{10}$ colony-forming units per milliliter, at least about $1\times10^{10}$ colony-forming units per milliliter to at least about $4\times10^{10}$ colony-forming units per milliliter, or at least about $1\times10^{10}$ colony-forming units per milliliter to at least about $6\times10^{10}$ colony-forming units per milliliter. In certain embodiments, fermentation broths provided herein will comprise yield or early vigor enhancing *Methylobacterium* sp. at a titer of, at least about $3\times10^{10}$ colony-forming units per milliliter to at least about $4\times10^{10}$ colony-forming units per milliliter, or at least about $3\times10^{10}$ colony-forming units per milliliter to at least about $6\times10^{10}$ colony-forming units per milliliter. In certain embodiments of any of the aforementioned compositions, the yield or early vigor enhancing *Methylobacterium* is selected from the group consisting of ISO02, ISO03, ISO09, ISO10, and derivatives thereof. In certain embodiments where the composition is applied prior to or during the reproductive stages of soybean development, the yield enhancing *Methylobacterium* is selected from the group consisting of ISO09, ISO10, or a derivative thereof. In certain embodiments where the composition is applied to the seed or during the vegetative stages of soybean development, the yield or early vigor enhancing *Methylobacterium* is ISO02, ISO03, ISO10, and derivatives thereof.

Solid substances with adherent yield or early vigor enhancing *Methylobacterium* sp. can be obtained as fermentation products can be used to make various compositions useful for treating plants or plant parts to improve soybean yield. Alternatively, compositions provided herein comprising yield enhancing *Methylobacterium* sp., solid substances with yield enhancing *Methylobacterium* sp. grown thereon, or comprising emulsions with yield enhancing *Methylobacterium* sp. grown therein can be used to treat plants or plant parts. Plants, plant parts, and, in particular, plant seeds that have been at least partially coated or coated with the fermentation broth products or compositions comprising yield enhancing *Methylobacterium* sp. are thus provided. Partial coating of a plant, a plant part, or a seed includes, but is not limited to coating at least about 5%, 10%, 20%, 30%, 40%, 50%, 60%, 70%, 80%, 90%, 95%, 98%, 99%, or about 99.5% of the surface area of the plant, plant part, or plant seed. Also provided are processed plant products that contain the fermentation broth products or compositions with yield or early vigor enhancing *Methylobacterium* sp. or adherent yield or early vigor enhancing *Methylobacterium* sp. Solid substances with adherent yield or early vigor enhancing *Methylobacterium* sp. can be used to make various compositions that are particularly useful for treating plant seeds. Seeds that have been at least partially coated with the fermentation broth products or compositions are thus provided. Partial coating of a seed includes, but is not limited to coating at least about 5%, 10%, 20%, 30%, 40%, 50%, 60%, 70%, 80%, 90%, 95%, 98%, 99%, or about 99.5% of the surface area of the seed. Also provided are processed seed products, including, but not limited to, meal, flour, feed, and flakes that contain the fermentation broth products or compositions provided herein. In certain embodiments, the processed plant product will be non-regenerable (i.e. will be incapable of developing into a plant). In certain embodiments, the solid substance used in the fermentation product or composition that at least partially coats the plant, plant part, or plant seed or that is contained in the processed plant, plant part, or seed product comprises a solid substance and associated or adherent yield or early vigor enhancing *Methylobacterium* sp. that can be readily identified by comparing a treated and an untreated plant, plant part, plant seed, or processed product thereof. In certain embodiments, the yield or early vigor enhancing

*Methylobacterium* is selected from the group consisting of ISO02, ISO03, ISO09, ISO10, and derivatives thereof.

Compositions useful for treating plants or plant parts that comprise yield or early vigor enhancing *Methylobacterium* sp., a solid substance with adherent yield or early vigor enhancing *Methylobacterium* sp., or comprising emulsions with yield or early vigor enhancing *Methylobacterium* sp. grown therein can also further comprise an agriculturally acceptable adjuvant or an agriculturally acceptable excipient. An agriculturally acceptable adjuvant or an agriculturally acceptable excipient is typically an ingredient that does not cause undue phytotoxicity or other adverse effects when exposed to a plant or plant part. In certain embodiments, the solid substance can itself be an agriculturally acceptable adjuvant or an agriculturally acceptable excipient so long as it is not bacteriocidal or bacteriostatic to the *Methylobacterium*. In other embodiments, the composition further comprises at least one of an agriculturally acceptable adjuvant or an agriculturally acceptable excipient. Any of the aforementioned compositions can also further comprise a pesticide. Pesticides used in the composition include, but are not limited to, an insecticide, a fungicide, a nematocide, and a bacteriocide. In certain embodiments, the pesticide used in the composition is a pesticide that does not substantially inhibit growth of the *Methylobacterium*. As *Methylobacterium* are gram negative bacteria, suitable bacteriocides used in the compositions can include, but are not limited to, bacteriocides that exhibit activity against gram positive bacteria but not gram negative bacteria. Compositions provided herein can also comprise a bacteriostatic agent that does not substantially inhibit growth of the *Methylobacterium*. Bacteriostatic agents suitable for use in compositions provided herein include, but are not limited to, those that exhibit activity against gram positive bacteria but not gram negative bacteria. Any of the aforementioned compositions can also be an essentially dry product (i.e. having about 5% or less water content), a mixture of the composition with an emulsion, or a suspension.

Agriculturally acceptable adjuvants used in the compositions that comprise yield or early vigor enhancing *Methylobacterium* sp. include, but are not limited to, components that enhance product efficacy and/or products that enhance ease of product application. Adjuvants that enhance product efficacy can include various wetters/spreaders that promote adhesion to and spreading of the composition on plant parts, stickers that promote adhesion to the plant part, penetrants that can promote contact of the active agent with interior tissues, extenders that increase the half-life of the active agent by inhibiting environmental degradation, and humectants that increase the density or drying time of sprayed compositions. Wetters/spreaders used in the compositions can include, but are not limited to, non-ionic surfactants, anionic surfactants, cationic surfactants, amphoteric surfactants, organo-silicate surfactants, and/or acidified surfactants. Stickers used in the compositions can include, but are not limited to, latex-based substances, terpene/pinolene, and pyrrolidone-based substances. Penetrants can include mineral oil, vegetable oil, esterified vegetable oil, organo-silicate surfactants, and acidified surfactants. Extenders used in the compositions can include, but are not limited to, ammonium sulphate, or menthene-based substances. Humectants used in the compositions can include, but are not limited to, glycerol, propylene glycol, and diethyl glycol. Adjuvants that improve ease of product application include, but are not limited to, acidifying/buffering agents, anti-foaming/de-foaming agents, compatibility agents, drift-reducing agents, dyes, and water conditioners. Anti-foaming/de-foaming agents used in the compositions can include, but are not limited to, dimethopolysiloxane. Compatibility agents used in the compositions can include, but are not limited to, ammonium sulphate. Drift-reducing agents used in the compositions can include, but are not limited to, polyacrylamides, and polysaccharides. Water conditioners used in the compositions can include, but are not limited to, ammonium sulphate.

Methods of treating plants and/or plant parts with the fermentation broths, fermentation broth products, and compositions comprising yield or early vigor enhancing *Methylobacterium* sp. are also provided herein. Treated plants, and treated plant parts obtained therefrom, include, but are not limited to, soybean. As used herein, the term soybean includes, but is not limited to all varieties, subspecies, and cultivars of *Glycine max*. Soybean subspecies include, but are not limited to, *Glycine max* L. ssp. max and *Glycine max* ssp. *Formosana*. Plant parts that are treated include, but are not limited to, leaves, stems, flowers, roots, seeds, pods, and the like. Seeds or other propagules of any of the aforementioned plants can be treated with the fermentation broths, fermentation broth products, fermentation products, and/or compositions provided herein.

In certain embodiments, plants and/or plant parts are treated by applying the fermentation broths, fermentation broth products, fermentation products, and compositions that comprise yield or early vigor enhancing *Methylobacterium* sp. as a spray. Such spray applications include, but are not limited to, treatments of a single plant part or any combination of plant parts. Spraying can be achieved with any device that will distribute the fermentation broths, fermentation broth products, fermentation products, and compositions to the plant and/or plant part(s). Useful spray devices include a boom sprayer, a hand or backpack sprayer, crop dusters (i.e. aerial spraying), and the like. Spraying devices and or methods providing for application of the fermentation broths, fermentation broth products, fermentation products, and compositions to either one or both of the adaxial surface and/or abaxial surface can also be used. Plants and/or plant parts that are at least partially coated with any of a biphasic fermentation broth, a fermentation broth product, fermentation product, or compositions that comprise a solid substance with yield or early vigor enhancing *Methylobacterium* sp. adhered thereto are also provided herein. Partial coating of a plant, a plant part, or a seed includes, but is not limited to coating at least about 5%, 10%, 20%, 30%, 40%, 50%, 60%, 70%, 80%, 90%, 95%, 98%, 99%, or about 99.5% of the surface area of the plant, plant part, or plant seed. Also provided herein are processed plant products that comprise a solid substance with yield or early vigor enhancing *Methylobacterium* sp. adhered thereto.

In certain embodiments, seeds are treated by exposing the seeds to the fermentation broths, fermentation broth products, fermentation products, and compositions that comprise yield or early vigor enhancing *Methylobacterium* sp. Seeds can be treated with the fermentation broths, fermentation broth products, and compositions provided herein by methods including, but not limited to, imbibition, coating, spraying, and the like. Seed treatments can be effected with both continuous and/or a batch seed treaters. In certain embodiments, the coated seeds can be prepared by slurrying seeds with a coating composition containing a fermentation broth, fermentation broth product, or compositions that comprise the solid substance with yield or early vigor enhancing *Methylobacterium* sp. and air drying the resulting product. Air drying can be accomplished at any temperature that is not deleterious to the seed or the *Methylobacterium*, but will typically not be greater than 30 degrees Centigrade. The proportion of coating that comprises a solid substance and yield or early vigor enhancing *Methylobacterium* sp. includes, but is not limited to, a range of 0.1 to 25% by weight of the seed, 0.5 to 5% by weight of the seed, and 0.5 to 2.5% by weight of seed. In certain embodiments, a solid substance used in the seed coating or treatment will have yield or early vigor enhancing *Methylobacterium* sp. adhered thereon. In certain embodiments, a solid substance used in the seed coating or treatment will be associated with yield or early vigor enhancing *Methylobacterium* sp. and will be a fermentation broth, fermentation broth product, or composition obtained by the methods provided herein. Various seed treatment compositions and methods for seed treatment disclosed in U.S. Pat. Nos. 5,106,648, 5,512,069, and 8,181,388 are incorporated herein by reference in their entireties and can be adapted for use with an active agent comprising the fermentation broths, fermentation broth products, or compositions provided herein. In certain embodiments, the composition used to treat the seed can contain agriculturally acceptable excipients that include, but are not limited to, woodflours, clays, activated carbon, diatomaceous earth, fine-grain inorganic solids, calcium carbonate and the like. Clays and inorganic solids that can be used with the fermentation broths, fermentation broth products, or compositions provided herein include, but are not limited to, calcium bentonite, kaolin, china clay, talc, perlite, mica, vermiculite, silicas, quartz powder, montmorillonite and mixtures thereof. Agriculturally acceptable adjuvants that promote sticking to the seed that can be used include, but are not limited to, polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses including ethylcelluloses and methylcelluloses, hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylamide polymers and copolymers, polyhydroxyethyl acrylate, methylacrylamide monomers, alginate, ethylcellulose, polychloroprene and syrups or mixtures thereof. Other useful agriculturally acceptable adjuvants that can promote coating include, but are not limited to, polymers and copolymers of vinyl acetate, polyvinylpyrrolidone-vinyl acetate copolymer and water-soluble waxes. Various surfactants, dispersants, anticaking-agents, foam-control agents, and dyes disclosed herein and in U.S. Pat. No. 8,181,388 can be adapted for use with an active agent comprising the fermentation broths, fermentation broth products, or compositions provided herein.

Provided herein are compositions that comprise yield or early vigor enhancing *Methylobacterium* sp. that provide for increase yield or improved early vigor of soybean plants relative to untreated plants, plant parts, and plants obtained therefrom that have not been exposed to the compositions. In certain embodiments, plant parts, including, but not limited to, a seed, a leaf, a fruit, a stem, a root, a tuber, or a coleoptile can be treated with the compositions provided herein to increase soybean plant yield. Treatments or applications can include, but are not limited to, spraying, coating, partially coating, immersing, and/or imbibing the plant or plant parts with the compositions provided herein. Partial coating of a plant, a plant part, or a seed includes, but is not limited to coating at least about 5%, 10%, 20%, 30%, 40%, 50%, 60%, 70%, 80%, 90%, 95%, 98%, 99%, or about 99.5% of the surface area of the plant, plant part, or plant seed. In certain embodiments, a seed, a leaf, a fruit, a stem, a root, a tuber, or a coleoptile can be immersed and/or imbibed with a liquid, semi-liquid, emulsion, or slurry of a composition provided herein. Such seed immersion or imbibition can be sufficient to provide for increased yield in a treated soybean plant or soybean plant grown from a treated seed in comparison to an untreated soybean plant or soybean plant grown from an untreated seed. In certain embodiments, plant seeds can be immersed and/or imbibed for at least 1, 2, 3, 4, 5, or 6 hours. Such immersion and/or imbibition can, in certain embodiments, be conducted at temperatures that are not deleterious to the plant seed or the *Methylobacterium*. In certain embodiments, the seeds can be treated at about 15 to about 30 degrees Centigrade or at about 20 to about 25 degrees Centigrade. In certain embodiments, seed imbibition and/or immersion can be performed with gentle agitation. In certain embodiments, the soybean seed or VE stage soybean plant is exposed to the composition by providing the composition in furrow. Providing the composition in furrow represents one of several methods provided herein for applying a composition to a soybean seed or to a soybean plant at about the VE stage of soybean plant development.

Compositions provided herein comprising yield or early vigor enhancing *Methylobacterium* sp. and related methods are therefore expected to be useful in improving yield or early vigor in a wide variety of soybean plants, including, but not limited to, all varieties, subspecies, and cultivars of *Glycine max*.

In certain embodiments, an amount of a composition provided herein that is sufficient to provide for increased soybean yield or early vigor can be a composition with yield or early vigor enhancing *Methylobacterium* sp. at a titer of at least about $1 \times 10^6$ colony-forming units per milliliter, at least about $5 \times 10^6$ colony-forming units per milliliter, at least about $1 \times 10^7$ colony-forming units per milliliter, at least about $5 \times 10^8$ colony-forming units per milliliter, at least about $1 \times 10^9$ colony-forming units per milliliter, at least about $1 \times 10^{10}$ colony-forming units per milliliter, or at least about $3 \times 10^{10}$ colony-forming units per milliliter. In certain embodiments, an amount of a composition provided herein that is sufficient to provide for increased soybean yield or early vigor to a plant or plant part can be a composition with yield or early vigor enhancing *Methylobacterium* sp. at a titer of about least about $1 \times 10^6$ colony-forming units per milliliter, at least about $5 \times 10^6$ colony-forming units per milliliter, at least about $1 \times 10^7$ colony-forming units per milliliter, or at least about $5 \times 10^8$ colony-forming units per milliliter to at least about $6 \times 10^{10}$ colony-forming units per milliliter of a liquid or an emulsion. In certain embodiments, an amount of a composition provided herein that is sufficient to provide for increased soybean yield can be a fermentation broth product with a yield or early vigor enhancing *Methylobacterium* sp. titer of a solid phase of that product is at least about $1 \times 10^6$ colony-forming units per milliliter, at least about $5 \times 10^6$ colony-forming units per milliliter, at least about $1 \times 10^7$ colony-forming units per milliliter, or at least about $5 \times 10^8$ colony-forming units per gram to at least about $6 \times 10^{10}$ colony-forming units of *Methylobacterium* per gram of the solid phase. In certain embodiments, an amount of a composition provided herein that is sufficient to provide for increased soybean yield or early vigor can be a composition with a *Methylobacterium* titer of at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram of particles in the composition containing the particles that comprise a solid substance wherein a mono-culture or co-culture of yield or early vigor enhancing *Methylobacterium* sp. is adhered thereto. In certain embodiments, an amount of a composition provided herein that is sufficient to provide for increased soybean yield to a plant or plant part can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL in a composition comprising an emulsion wherein a mono-culture or co-culture of a yield or early vigor enhancing *Methylobacterium* sp. adhered to a solid substance is provided therein or grown therein. In certain embodiments, an amount of a composition provided herein that is sufficient to provide for increased soybean yield to a plant or plant part can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL of in a composition comprising an emulsion wherein a mono-culture or co-culture of a yield or early vigor enhancing *Methylobacterium* sp. is provided therein or grown therein. In certain embodiments of any of the aforementioned compositions, the *Methylobacterium* sp. is selected from the group consisting of ISO02 (NRRL B-50930), ISO03 (NRRL B-50931), ISO09 (NRRL B-50937, ISO10 (NRRL B-50938), and derivatives thereof.

In certain embodiments, an amount of a composition provided herein that is sufficient to provide for increased soybean yield can be a composition with a *Methylobacterium* sp. at a titer of at least about $1 \times 10^4$ colony-forming units per milliliter, at least about $1 \times 10^5$ colony-forming units per milliliter, at least about $1 \times 10^6$ colony-forming units per milliliter, at least about $5 \times 10^6$ colony-forming units per milliliter, at least about $1 \times 10^7$ colony-forming units per milliliter, at least about $5 \times 10^8$ colony-forming units per milliliter, at least about $1 \times 10^9$ colony-forming units per milliliter, at least about $1 \times 10^{10}$ colony-forming units per milliliter, or at least about $3 \times 10^{10}$ colony-forming units per milliliter. In certain embodiments, an amount of a composition provided herein that is sufficient to provide for increased soybean yield can be a composition with *Methylobacterium* sp. at a titer of at least about $1 \times 10^4$ colony-forming units per milliliter, at least about $1 \times 10^5$ colony-forming units per milliliter, about least about $1 \times 10^6$ colony-forming units per milliliter, at least about $5 \times 10^6$ colony-forming units per milliliter, at least about $1 \times 10^7$ colony-forming units per milliliter, or at least about $5 \times 10^8$ colony-forming units per milliliter to at least about $6 \times 10^{10}$ colony-forming units per milliliter of a liquid or an emulsion. In certain embodiments, an amount of a composition provided herein that is sufficient to provide for increased soybean yield can be a fermentation broth product with a *Methylobacterium* sp. titer of a solid phase of that product is at least about $1 \times 10^4$ colony-forming units per gram, at least about $1 \times 10^5$ colony-forming units per gram, at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram, at least about $1 \times 10^{11}$ colony-forming units of *Methylobacterium* per gram, at least about $1 \times 10^{12}$ colony-forming units of *Methylobacterium* per gram, at least about $1 \times 10^{13}$ colony-forming units of *Methylobacterium* per gram, or at least about $5 \times 10^{13}$ colony-forming units of *Methylobacterium* per gram of the solid phase. In certain embodiments, an amount of a composition provided herein that is sufficient to provide for increased soybean yield can be a composition with a *Methylobacterium* titer of at least about $1 \times 10^6$ colony-forming units per gram, at least about $5 \times 10^6$ colony-forming units per gram, at least about $1 \times 10^7$ colony-forming units per gram, or at least about $5 \times 10^8$ colony-forming units per gram to at least about $6 \times 10^{10}$ colony-forming units of *Methylobacterium* per gram, at least about $1 \times 10^{11}$ colony-forming units of *Methylobacterium* per gram, at least about $1 \times 10^{12}$ colony-forming units of *Methylobacterium* per gram, at least about $1 \times 10^{13}$ colony-forming units of *Methylobacterium* per gram, or at least about $5 \times 10^{13}$ colony-forming units of *Methylobacterium* per gram of particles in the composition containing the particles that comprise a solid substance wherein a mono-culture or co-culture of *Methylobacterium* sp. is adhered thereto. In certain embodiments, an amount of a composition provided herein that is sufficient to provide for increased soybean yield can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL in a composition comprising an emulsion wherein a mono-culture or co-culture of a *Methylobacterium* sp. adhered to a solid substance is provided therein or grown therein. In certain embodiments, an amount of a composition provided herein that is sufficient to provide for increased soybean yield can be a composition with a *Methylobacterium* titer of at least about $1 \times 10^6$ colony-forming units per mL, at least about $5 \times 10^6$ colony-forming units per mL, at least about $1 \times 10^7$ colony-forming units per mL, or at least about $5 \times 10^8$ colony-forming units per mL to at least about $6 \times 10^{10}$ colony-forming units of *Methylobacterium* per mL of in a composition comprising an emulsion wherein a mono-culture or co-culture of a *Methylobacterium* sp. is provided therein or grown therein. In certain embodiments of any of the aforementioned compositions, the *Methylobacterium* sp. is selected from the group consisting of ISO02 (NRRL B-50930), ISO03 (NRRL B-50931), ISO09 (NRRL B-50937, ISO10 (NRRL B-50938), and derivatives thereof.

EXAMPLES

The following examples are included to demonstrate preferred embodiments of the invention. It will be appreciated by those of skill in the art that the techniques disclosed in the following examples represent techniques discovered by the Applicants to function well in the practice of the invention, and thus can be considered to constitute preferred modes for its practice. However, those of skill in the art should, in light of the instant disclosure, appreciate that many changes can be made in the specific embodiments that are disclosed, while still obtaining like or similar results, without departing from the scope of the invention.

Example 1. Increases in Soybean Yield by Application of *Methylobacterium* Compositions Soybean Foliar Field Trials Soybean field trials were established at six Illinois, USA locations for the purpose of evaluating 14 PPFM (pink-pigmented-facultative-methylotrophs of the species *Methylobacterium*) isolates applied as a foliar spray to soybean plants at an early vegetative stage (V3) and also at a reproductive stage (R1). The locations were established at Cropsey, Dana, Homer, Farmer City, Farmington and Pesotum, all in Illinois.

Experimental Design

The trial was conducted as a split-plot design consisting of four 30-inch rows and were 20 feet long. The two middle rows were the treatment rows, the two outside rows were used as untreated border rows. There were eight replications of each of the 14 PPFM treatments for application at growth stages V3 and R1. The 14 PPFM treatments plus the control (no PPFM, also referred to as "check") comprised the whole plot, and the growth stage V3 and R1 comprised the split plot. There was a V3 and R1 control included in each of the 8 replications.

Methods

In preparation for the field trials, the PPFM cultures were grown in AMS+glycerol+peptone+diatomaceous earth media at 30° C. for 6 days. The ammonium mineral salts (AMS) medium contains, per liter, 700 milligrams of dibasic potassium phosphate anhydrous, 540 milligrams of monobasic potassium phosphate anhydrous, one gram of magnesium sulfate heptahydrate, 500 milligrams of ammonium chloride anhydrous, and 200 milligrams of calcium chloride dihydrate.

AMS base medium was prepared from three stock solutions, listed below:

| Stock solution I: for one liter at 50X concentration | |
|---|---|
| dibasic potassium phosphate, anhydrous | 35 grams |
| monobasic potassium phosphate, anhydrous | 27 grams |
| Stock solution II: for one liter at 50X concentration | |
| magnesium sulfate heptahydrate | 50 grams |
| ammonium chloride, anhydrous | 25 grams |
| Stock solution III: for one liter at 50X concentration | |
| calcium chloride dihydrate | 10 grams |

Stock solutions I, II, and III were autoclaved separately.

To prepare one liter of liquid AMS medium with glycerol, peptone, and diatomaceous earth, the following were added to 920 ml of distilled water:

20 ml of stock solution I
20 ml of stock solution II
20 ml of stock solution III
20 ml of a 50% glycerol stock solution
10 grams of peptone
2 grams of diatomaceous earth The resulting solution with suspended diatomaceous earth was sterilized by autoclaving. The cultures were then harvested by centrifugation at 5000 rpm for 15 minutes and then re-suspended in AMS+glycerol+peptone with 20% glycerol as a cryoprotectant at 10× concentration. The cultures were aliquoted and frozen at −80 until thawed for use. The liquid PPFM preparations were applied to the soybean plants at the V3 or R1 stages at a rate of 15 gal per acre using a backpack chemical sprayer. Titers of the PPFMs applied at the various locations for both the R1 and V3 PPFM applications are provided in Tables 5 and 6, respectively. The trials were established within existing farmer field sites and were managed with local agronomic methods that the farmer practices throughout the growing season. All soybean varieties used were Roundup Ready™ varieties, and the trials were sprayed with glyphosate at the V4 stage of growth. The trials were harvested for yield at physiological maturity with a commercial harvest combine. Table 2 indicates the variety planted, planting date and harvest date at the soybean foliar sites.

TABLE 2

Variety planted, planting date and harvest date at the six Illinois soybean foliar sites

| Location | Cropsey, IL | Dana, IL | Farmer City, IL | Farmington, IL | Homer, IL | Pesotum, IL |
|---|---|---|---|---|---|---|
| Variety | Great Lakes ™ GL3289R2 (Ovid, MI, USA) | DuPont ™ Pioneer ™ 92Y75 (Johnston, IA, USA) | Monsanto ™ Asgrow ™ 3432 (St. Louis, MO) | DuPont ™ Pioneer ™ RJS38001 (Johnston, IA, USA) | DuPont ™ Pioneer ™ 93Y84 (Johnston, IA, USA) | DuPont ™ Pioneer ™ XBP37008 (Johnston, IA, USA) |
| Planting date | May 13, 2013 | May 17, 2013 | May 18, 2013 | Jun. 13, 2013 | May 18, 2013 | May 18, 2013 |
| Harvest date | Sep. 26, 2013 | Sep. 23, 2013 | Sep. 30, 2013 | Oct. 16, 2013 | Oct. 11, 2013 | Sep. 25, 2013 |

Results

Analysis of variance (ANOVA) was conducted with the Analyze—Fit Model routine in JMP version 11.0 (SAS Institute). After the parameter estimates were obtained from the models, plots of residuals and tables of studentized residuals were examined for conformity with the assumptions of normality and constant variance. Comparisons of isolates with the check within the same growth stage at application were performed with two-tailed t-tests applied to the pairwise differences between least-squares means estimated from the ANOVA model, under the null hypothesis that the difference in means was zero.

The following model was applied to the split plot design at the six individual locations:

$$Y_{ijk}=M+I_i+S_j+IS_{ij}+R_k+IR_{ik}+e_{ijk},\quad [1]$$

where $Y_{ijk}$ is the yield of isolate i at stage j in replicate k, M represents the overall mean, $I_i$ is the fixed effect of isolate i, $S_j$ is the fixed effect of stage j, $IS_{ij}$ is the fixed effect of the interaction of isolate i and stage j, $R_k$ is the random effect of replicate k, $IR_{ik}$ is the random effect of the interaction of isolate i and replicate k, and $e_{ijk}$ is the random error.

Across-locations analyses for the six locations were conducted according to the following model:

$$Y_{hijk}=M+I_i+S_j+IS_{ij}+L_h+R(L)_{k(h)}+LI_{hi}+IR(L)_{ik(h)}+LS_{hj}+LIS_{hij}+e_{hijk},\quad [2]$$

where $Y_{hijk}$ is the yield at location h of isolate i at stage j in replicate k, M represents the overall mean, $I_i$ is the fixed effect of isolate i, $S_j$ is the fixed effect of stage j, $IS_{ij}$ is the fixed effect of the interaction of isolate i and stage j, $L_h$ is the random effect of location h, $R(L)_{k(h)}$ is the random effect of replicate k nested within location h, $LI_{hi}$ is the random effect of the interaction of location h and isolate i, $IR(L)_{ik(h)}$ is the random effect of the interaction of isolate i and replicate k nested within location h, $LS_{hj}$ is the random effect of the interaction of location h and stage j, $LIS_{hij}$ is the random effect of the three-way interaction of location h with isolate i and stage j, and $e_{hijk}$ is the random error.

Seven of the 14 PPFM isolates showed a significant (p=0.25) yield response vs the V3 or R1 check they were compared to in at least one location (Table 3). One isolate showed a significant increase vs the check across the six locations at both application stages (Table 4)

Five of 6 locations had at least one significant PPFM response.

TABLE 3

Mean yield, yield ranking, and p values of PPFM isolates at each of six soybean foliar locations by growth stage

| Location | Treatment | Stage | Yield | Rank | P Value |
|---|---|---|---|---|---|
| Cropsey | ISO01 | V3 | 63.8 | 1 | 0.972 |
| Cropsey | Check | V3 | 63.7 | 2 | — |
| Cropsey | ISO10 | V3 | 63.2 | 3 | 0.833 |
| Cropsey | ISO14 | V3 | 62.4 | 4 | 0.592 |
| Cropsey | ISO03 | V3 | 61.9 | 5 | 0.442 |
| Cropsey | ISO07 | V3 | 61.6 | 6 | 0.381 |
| Cropsey | ISO08 | V3 | 61.5 | 7 | 0.358 |
| Cropsey | ISO05 | V3 | 60.9 | 8 | 0.239 |
| Cropsey | ISO09 | V3 | 60.7 | 9 | 0.219 |
| Cropsey | ISO13 | V3 | 60.6 | 10 | 0.193 |
| Cropsey | ISO06 | V3 | 60.1 | 11 | 0.134 |
| Cropsey | ISO02 | V3 | 60.0 | 12 | 0.131 |
| Cropsey | ISO04 | V3 | 60.0 | 13 | 0.129 |
| Cropsey | ISO12 | V3 | 59.5 | 14 | 0.085 |
| Cropsey | ISO11 | V3 | 58.5 | 15 | 0.034 |
| Cropsey | ISO14 | R1 | 63.5 | 1 | 0.568 |
| Cropsey | ISO01 | R1 | 63.2 | 2 | 0.665 |
| Cropsey | Check | R1 | 62.1 | 3 | — |
| Cropsey | ISO10 | R1 | 61.7 | 4 | 0.860 |
| Cropsey | ISO03 | R1 | 61.6 | 5 | 0.817 |
| Cropsey | ISO07 | R1 | 61.3 | 6 | 0.735 |
| Cropsey | ISO09 | R1 | 61.1 | 7 | 0.675 |
| Cropsey | ISO08 | R1 | 60.7 | 8 | 0.569 |
| Cropsey | ISO11 | R1 | 59.7 | 9 | 0.313 |
| Cropsey | ISO02 | R1 | 59.7 | 10 | 0.310 |
| Cropsey | ISO06 | R1 | 59.6 | 11 | 0.298 |
| Cropsey | ISO12 | R1 | 59.6 | 12 | 0.290 |
| Cropsey | ISO05 | R1 | 59.4 | 13 | 0.270 |
| Cropsey | ISO13 | R1 | 58.7 | 14 | 0.154 |
| Cropsey | ISO04 | R1 | 58.0 | 15 | 0.089 |
| Dana | ISO10 | V3 | 56.5 | 1 | 0.092 |
| Dana | ISO03 | V3 | 56.4 | 2 | 0.108 |
| Dana | ISO01 | V3 | 55.3 | 3 | 0.271 |
| Dana | ISO07 | V3 | 55.3 | 4 | 0.271 |
| Dana | ISO09 | V3 | 55.0 | 5 | 0.316 |
| Dana | ISO02 | V3 | 54.3 | 6 | 0.492 |
| Dana | ISO14 | V3 | 54.3 | 7 | 0.508 |
| Dana | ISO12 | V3 | 54.1 | 8 | 0.573 |
| Dana | ISO11 | V3 | 54.1 | 9 | 0.574 |
| Dana | ISO08 | V3 | 53.6 | 10 | 0.714 |
| Dana | Check | V3 | 52.8 | 11 | — |
| Dana | ISO06 | V3 | 52.8 | 12 | 0.993 |
| Dana | ISO05 | V3 | 52.8 | 13 | 0.981 |

TABLE 3-continued

Mean yield, yield ranking, and p values of PPFM isolates at each of six soybean foliar locations by growth stage

| Location | Treatment | Stage | Yield | Rank | P Value |
|---|---|---|---|---|---|
| Dana | ISO04 | V3 | 51.6 | 14 | 0.573 |
| Dana | ISO13 | V3 | 51.0 | 15 | 0.411 |
| Dana | ISO02 | R1 | 55.6 | 1 | 0.330 |
| Dana | ISO10 | R1 | 55.1 | 2 | 0.451 |
| Dana | ISO12 | R1 | 54.9 | 3 | 0.503 |
| Dana | ISO06 | R1 | 54.7 | 4 | 0.566 |
| Dana | ISO11 | R1 | 54.7 | 5 | 0.575 |
| Dana | ISO09 | R1 | 54.4 | 6 | 0.664 |
| Dana | ISO07 | R1 | 54.2 | 7 | 0.732 |
| Dana | ISO03 | R1 | 53.6 | 8 | 0.946 |
| Dana | ISO14 | R1 | 53.6 | 9 | 0.965 |
| Dana | Check | R1 | 53.5 | 10 | — |
| Dana | ISO01 | R1 | 53.4 | 11 | 0.987 |
| Dana | ISO08 | R1 | 53.3 | 12 | 0.929 |
| Dana | ISO13 | R1 | 52.7 | 13 | 0.723 |
| Dana | ISO05 | R1 | 52.6 | 14 | 0.696 |
| Dana | ISO04 | R1 | 51.1 | 15 | 0.284 |
| F. City | ISO07 | V3 | 78.8 | 1 | 0.244 |
| F. City | ISO14 | V3 | 78.4 | 2 | 0.299 |
| F. City | ISO04 | V3 | 76.9 | 3 | 0.552 |
| F. City | ISO13 | V3 | 76.7 | 4 | 0.606 |
| F. City | ISO10 | V3 | 75.7 | 5 | 0.829 |
| F. City | Check | V3 | 75.0 | 6 | — |
| F. City | ISO08 | V3 | 74.5 | 7 | 0.867 |
| F. City | ISO06 | V3 | 74.4 | 8 | 0.859 |
| F. City | ISO02 | V3 | 74.1 | 9 | 0.766 |
| F. City | ISO12 | V3 | 73.0 | 10 | 0.525 |
| F. City | ISO09 | V3 | 72.7 | 11 | 0.473 |
| F. City | ISO05 | V3 | 72.6 | 12 | 0.451 |
| F. City | ISO11 | V3 | 72.0 | 13 | 0.347 |
| F. City | ISO01 | V3 | 71.9 | 14 | 0.334 |
| F. City | ISO03 | V3 | 70.4 | 15 | 0.152 |
| F. City | ISO07 | R1 | 76.8 | 1 | 0.773 |
| F. City | ISO13 | R1 | 76.6 | 2 | 0.828 |
| F. City | ISO10 | R1 | 76.2 | 3 | 0.916 |
| F. City | Check | R1 | 75.9 | 4 | — |
| F. City | ISO14 | R1 | 75.0 | 5 | 0.795 |
| F. City | ISO02 | R1 | 74.8 | 6 | 0.727 |
| F. City | ISO05 | R1 | 73.8 | 7 | 0.526 |
| F. City | ISO06 | R1 | 73.6 | 8 | 0.474 |
| F. City | ISO04 | R1 | 73.3 | 9 | 0.429 |
| F. City | ISO08 | R1 | 73.2 | 10 | 0.411 |
| F. City | ISO09 | R1 | 73.0 | 11 | 0.364 |
| F. City | ISO12 | R1 | 71.8 | 12 | 0.202 |
| F. City | ISO11 | R1 | 71.8 | 13 | 0.200 |
| F. City | ISO03 | R1 | 71.4 | 14 | 0.162 |
| F. City | ISO01 | R1 | 71.4 | 15 | 0.159 |
| Farmington | ISO10 | V3 | 60.8 | 1 | 0.11 |
| Farmington | ISO14 | V3 | 59.0 | 2 | 0.40 |
| Farmington | ISO12 | V3 | 58.8 | 3 | 0.45 |
| Farmington | ISO09 | V3 | 58.7 | 4 | 0.47 |
| Farmington | ISO07 | V3 | 58.4 | 5 | 0.56 |
| Farmington | ISO03 | V3 | 58.1 | 6 | 0.64 |
| Farmington | ISO13 | V3 | 58.0 | 7 | 0.69 |
| Farmington | ISO02 | V3 | 57.9 | 8 | 0.71 |
| Farmington | ISO01 | V3 | 57.7 | 9 | 0.77 |
| Farmington | ISO06 | V3 | 57.4 | 10 | 0.88 |
| Farmington | Check | V3 | 57.0 | 11 | — |
| Farmington | ISO04 | V3 | 57.0 | 12 | 0.99 |
| Farmington | ISO05 | V3 | 56.7 | 13 | 0.90 |
| Farmington | ISO08 | V3 | 56.7 | 14 | 0.87 |
| Farmington | ISO11 | V3 | 55.5 | 15 | 0.52 |
| Farmington | ISO10 | R1 | 60.7 | 1 | 0.05 |
| Farmington | ISO13 | R1 | 60.3 | 2 | 0.08 |
| Farmington | ISO12 | R1 | 59.2 | 3 | 0.19 |
| Farmington | ISO09 | R1 | 59.0 | 4 | 0.22 |
| Farmington | ISO03 | R1 | 58.7 | 5 | 0.27 |
| Farmington | ISO07 | R1 | 58.3 | 6 | 0.36 |
| Farmington | ISO14 | R1 | 58.1 | 7 | 0.40 |
| Farmington | ISO06 | R1 | 57.9 | 8 | 0.46 |
| Farmington | ISO05 | R1 | 57.0 | 9 | 0.72 |
| Farmington | ISO08 | R1 | 56.9 | 10 | 0.75 |
| Farmington | ISO02 | R1 | 56.8 | 11 | 0.77 |
| Farmington | Check | R1 | 56.1 | 12 | — |
| Farmington | ISO01 | R1 | 55.8 | 13 | 0.88 |

TABLE 3-continued

Mean yield, yield ranking, and p values of PPFM isolates at each of six soybean foliar locations by growth stage

| Location | Treatment | Stage | Yield | Rank | P Value |
|---|---|---|---|---|---|
| Farmington | ISO11 | R1 | 55.7 | 14 | 0.86 |
| Farmington | ISO04 | R1 | 49.0 | 15 | 0.88 |
| Homer | ISO10 | V3 | 83.2 | 1 | 0.34 |
| Homer | ISO09 | V3 | 81.9 | 2 | 0.58 |
| Homer | ISO12 | V3 | 80.9 | 3 | 0.81 |
| Homer | ISO03 | V3 | 80.4 | 4 | 0.96 |
| Homer | Check | V3 | 80.2 | 5 | — |
| Homer | ISO14 | V3 | 79.2 | 6 | 0.74 |
| Homer | ISO04 | V3 | 78.9 | 7 | 0.67 |
| Homer | ISO13 | V3 | 78.6 | 8 | 0.59 |
| Homer | ISO06 | V3 | 78.5 | 9 | 0.59 |
| Homer | ISO08 | V3 | 78.5 | 10 | 0.58 |
| Homer | ISO05 | V3 | 78.4 | 11 | 0.56 |
| Homer | ISO11 | V3 | 77.1 | 12 | 0.31 |
| Homer | ISO02 | V3 | 76.9 | 13 | 0.29 |
| Homer | ISO01 | V3 | 75.5 | 14 | 0.13 |
| Homer | ISO07 | V3 | 74.9 | 15 | 0.08 |
| Homer | ISO09 | R1 | 81.5 | 1 | 0.21 |
| Homer | ISO10 | R1 | 81.2 | 2 | 0.18 |
| Homer | ISO12 | R1 | 80.9 | 3 | 0.22 |
| Homer | ISO11 | R1 | 79.2 | 4 | 0.50 |
| Homer | ISO14 | R1 | 79.2 | 5 | 0.50 |
| Homer | ISO13 | R1 | 78.8 | 6 | 0.57 |
| Homer | ISO07 | R1 | 78.7 | 7 | 0.60 |
| Homer | ISO05 | R1 | 78.6 | 8 | 0.62 |
| Homer | ISO02 | R1 | 78.6 | 9 | 0.62 |
| Homer | ISO03 | R1 | 78.5 | 10 | 0.63 |
| Homer | ISO01 | R1 | 78.2 | 11 | 0.72 |
| Homer | ISO08 | R1 | 77.9 | 12 | 0.78 |
| Homer | ISO04 | R1 | 77.7 | 13 | 0.83 |
| Homer | Check | R1 | 77.1 | 14 | — |
| Homer | ISO06 | R1 | 77.1 | 15 | 0.99 |
| Pesotum | ISO02 | V3 | 63.9 | 1 | 0.13 |
| Pesotum | ISO08 | V3 | 62.4 | 2 | 0.42 |
| Pesotum | ISO13 | V3 | 62.4 | 3 | 0.43 |
| Pesotum | ISO01 | V3 | 61.9 | 4 | 0.55 |
| Pesotum | ISO14 | V3 | 61.8 | 5 | 0.59 |
| Pesotum | ISO09 | V3 | 61.1 | 6 | 0.84 |
| Pesotum | ISO05 | V3 | 60.9 | 7 | 0.90 |
| Pesotum | ISO06 | V3 | 60.9 | 8 | 0.91 |
| Pesotum | ISO10 | V3 | 60.8 | 9 | 0.94 |
| Pesotum | ISO07 | V3 | 60.8 | 10 | 0.94 |
| Pesotum | Check | V3 | 60.6 | 11 | — |
| Pesotum | ISO12 | V3 | 60.6 | 12 | 1.00 |
| Pesotum | ISO03 | V3 | 60.0 | 13 | 0.76 |
| Pesotum | ISO04 | V3 | 59.7 | 14 | 0.67 |
| Pesotum | ISO11 | V3 | 59.5 | 15 | 0.62 |
| Pesotum | ISO02 | R1 | 63.0 | 1 | 0.32 |
| Pesotum | ISO03 | R1 | 62.8 | 2 | 0.36 |
| Pesotum | ISO07 | R1 | 62.4 | 3 | 0.46 |
| Pesotum | ISO08 | R1 | 61.6 | 4 | 0.73 |
| Pesotum | ISO09 | R1 | 61.2 | 5 | 0.86 |
| Pesotum | ISO04 | R1 | 61.2 | 6 | 0.87 |
| Pesotum | ISO01 | R1 | 61.1 | 7 | 0.89 |
| Pesotum | ISO13 | R1 | 60.9 | 8 | 0.94 |
| Pesotum | Check | R1 | 60.8 | 9 | — |
| Pesotum | ISO14 | R1 | 60.4 | 10 | 0.87 |
| Pesotum | ISO05 | R1 | 60.2 | 11 | 0.79 |
| Pesotum | ISO11 | R1 | 60.1 | 12 | 0.76 |
| Pesotum | ISO10 | R1 | 60.0 | 13 | 0.73 |
| Pesotum | ISO12 | R1 | 59.6 | 14 | 0.60 |
| Pesotum | ISO06 | R1 | 58.2 | 15 | 0.24 |

TABLE 4

Mean yield, yield ranking, and p values of PPFM isolates across combined six combined soybean foliar locations by growth stage

| Location | PPFM Treatment | Stage | Yield bu/acre | Rank | P value |
|---|---|---|---|---|---|
| Across 6 Locations | ISO10 | V3 | 67.9 | 1 | 0.09 |
| Across 6 Locations | ISO14 | V3 | 67.2 | 2 | 0.37 |
| Across 6 Locations | Check | V3 | 66.5 | 3 | — |
| Across 6 Locations | ISO09 | V3 | 66.3 | 4 | 0.90 |
| Across 6 Locations | ISO07 | V3 | 66.3 | 5 | 0.97 |
| Across 6 Locations | ISO08 | V3 | 66.1 | 6 | 0.71 |
| Across 6 Locations | ISO02 | V3 | 65.9 | 7 | 0.72 |
| Across 6 Locations | ISO13 | V3 | 65.8 | 8 | 0.71 |
| Across 6 Locations | ISO03 | V3 | 65.8 | 9 | 0.71 |
| Across 6 Locations | ISO01 | V3 | 65.7 | 10 | 0.60 |
| Across 6 Locations | ISO12 | V3 | 65.6 | 11 | 0.69 |
| Across 6 Locations | ISO04 | V3 | 65.4 | 12 | 0.40 |
| Across 6 Locations | ISO06 | V3 | 65.3 | 13 | 0.40 |
| Across 6 Locations | ISO05 | V3 | 65.1 | 14 | 0.26 |
| Across 6 Locations | ISO11 | V3 | 64.2 | 15 | 0.04 |
| Across 6 Locations | ISO10 | R1 | 66.9 | 1 | 0.13 |
| Across 6 Locations | ISO07 | R1 | 66.7 | 2 | 0.32 |
| Across 6 Locations | ISO14 | R1 | 66.3 | 3 | 0.49 |
| Across 6 Locations | ISO02 | R1 | 66.3 | 4 | 0.64 |
| Across 6 Locations | Check | R1 | 65.9 | 5 | — |
| Across 6 Locations | ISO09 | R1 | 65.8 | 6 | 0.51 |
| Across 6 Locations | ISO03 | R1 | 65.6 | 7 | 0.86 |
| Across 6 Locations | ISO13 | R1 | 65.5 | 8 | 0.69 |
| Across 6 Locations | ISO01 | R1 | 65.4 | 9 | 0.70 |
| Across 6 Locations | ISO12 | R1 | 65.4 | 10 | 0.93 |
| Across 6 Locations | ISO08 | R1 | 65.3 | 11 | 0.77 |
| Across 6 Locations | ISO11 | R1 | 65.1 | 12 | 0.49 |
| Across 6 Locations | ISO05 | R1 | 64.9 | 13 | 0.55 |
| Across 6 Locations | ISO06 | R1 | 64.6 | 14 | 0.48 |
| Across 6 Locations | ISO04 | R1 | 64.3 | 15 | 0.23 |

TABLE 5

Titers of PPFMs Applied at the R1 stage at Various Locations (in CFU/mL)

| NLS # | Isolate | Cropsey Titer | Pesotum Titer | Farmer City Titer | Homer Titer | Dana Titer | Farmington Titer |
|---|---|---|---|---|---|---|---|
| 0046 | ISO01 | 3.2E+08 | 8.6E+08 | 8.6E+08 | 5.6E+08 | 8.6E+08 | 5.6E+08 |
| 0020 | ISO02 | 1.0E+09 | 1.2E+09 | 7.4E+08 | 1.2E+09 | 1.2E+09 | 1.2E+09 |
| 0017 | ISO03 | 4.6E+08 | 7.4E+08 | 2.8E+08 | 5.7E+08 | 2.8E+08 | 5.7E+08 |
| 0042 | ISO04 | 3.9E+08 | 2.4E+08 | 2.4E+08 | 1.4E+08 | 2.4E+08 | 1.4E+08 |
| 0089 | ISO05 | 1.7E+08 | 1.7E+08 | 4.8E+08 | 6.7E+08 | 6.7E+08 | 6.7E+08 |
| 0068 | ISO06 | 5.0E+08 | 2.4E+08 | 2.6E+08 | 2.6E+08 | 2.6E+08 | 2.4E+08 |
| 0065 | ISO07 | 3.7E+08 | 3.8E+08 | 3.8E+08 | 4.2E+08 | 3.8E+08 | 3.7E+08 |
| 0069 | ISO08 | 2.4E+08 | 2.0E+08 | 2.0E+08 | 2.7E+08 | 5.7E+08 | 2.7E+08 |
| 0062 | ISO09 | 1.5E+08 | 1.0E+08 | 1.0E+08 | 3.4E+08 | 1.0E+08 | 2.9E+08 |

TABLE 5-continued

Titers of PPFMs Applied at the R1 stage at Various Locations (in CFU/mL)

| NLS # | Isolate | Cropsey Titer | Pesotum Titer | Farmer City Titer | Homer Titer | Dana Titer | Farmington Titer |
|---|---|---|---|---|---|---|---|
| 0064 | ISO10 | 9.5E+08 | 5.9E+08 | 8.4E+08 | 9.0E+08 | 9.0E+08 | 3.1E+08 |
| 0021 | ISO11 | ND[1] | 9.7E+08 | 9.7E+07 | 1.2E+08 | 9.7E+07 | 1.2E+08 |
| 0066 | ISO12 | 2.9E+08 | 5.6E+08 | 5.6E+08 | 3.4E+08 | 5.6E+08 | 4.8E+08 |
| 0037 | ISO13 | 2.3E+08 | 2.3E+08 | 2.3E+08 | ND[1] | 2.3E+08 | ND[1] |
| 0038 | ISO14 | 2.6E+07 | 1.6E+08 | 5.0E+07 | 6.7E+08 | 6.7E+07 | 1.3E+08 |

[1]ND: Not determined.

TABLE 6

Titers of PPFMs Applied at the V3 stage at Various Locations (in CFU/mL)

| NLS # | Isolate | Cropsey Titer | Pesotum Titer | Farmer City Titer | Homer Titer | Dana Titer | Farmington Titer |
|---|---|---|---|---|---|---|---|
| 0046 | ISO01 | 4.2E+08 | 5.3E+08 | 3.2E+08 | 5.3E+08 | 5.3E+08 | 5.6E+08 |
| 0020 | ISO02 | 1.0E+09 | 1.1E+09 | 1.1E+09 | 1.1E+09 | 6.0E+08 | 9.5E+08 |
| 0017 | ISO03 | 6.2E+08 | 5.5E+08 | 5.9E+08 | 4.1E+08 | 4.6E+08 | 5.7E+08 |
| 0042 | ISO04 | 2.2E+08 | 2.3E+08 | 2.2E+08 | 3.9E+08 | 2.3E+08 | 1.4E+08 |
| 0089 | ISO05 | 1.2E+08 | 1.2E+08 | 1.2E+08 | 1.7E+08 | 1.2E+08 | 6.7E+08 |
| 0068 | ISO06 | 4.3E+08 | 2.9E+08 | 2.9E+08 | 6.2E+08 | ND[1] | 3.1E+08 |
| 0065 | ISO07 | 2.9E+08 | 2.9E+08 | 2.9E+08 | 3.7E+08 | 3.7E+08 | 4.2E+08 |
| 0069 | ISO08 | 1.9E+08 | 1.9E+08 | 2.0E+08 | 3.4E+08 | 1.9E+08 | 2.7E+08 |
| 0062 | ISO09 | 1.5E+08 | 1.5E+08 | 1.5E+08 | 1.5E+08 | 1.1E+08 | 3.4E+08 |
| 0064 | ISO10 | 9.5E+08 | 9.5E+08 | 9.5E+08 | 9.5E+08 | 9.5E+08 | 8.4E+08 |
| 0021 | ISO11 | ND[1] | ND[1] | ND[1] | ND[1] | ND[1] | 1.2E+08 |
| 0066 | ISO12 | 3.0E+08 | 2.7E+08 | 3.0E+08 | 2.9E+08 | 2.9E+08 | 3.4E+08 |
| 0037 | ISO13 | ND[1] | ND[1] | ND[1] | 2.3E+08 | 2.3E+08 | ND[1] |
| 0038 | ISO14 | 2.6E+07 | 2.6E+07 | 2.6E+07 | 2.6E+07 | 2.6E+07 | 1.6E+08 |

[1]ND: Not determined.

Example 2. Results of 2014 Field Tests

Strains for use in 2014 field trials were selected based on results from 1) previous field trials conducted in the summer of 2013 and 2) laboratory and controlled environment assays. All three strains used in 2014 soy field trials demonstrated a positive effect on soy yield in the 2013 field trials and beneficial effects on various agronomic traits in laboratory and controlled environment assays.

In spring of 2014, field trials designed to evaluate the effect of the three selected PPFM strains on soybean yield were established at sites throughout the Midwest soybean growing area. These included sites in Iowa, Illinois, Nebraska, Missouri, Ohio, and Wisconsin. At each site, the experiment was set-up as a Randomized Complete Block Design with six replications. The minimum plot sizes were four rows of 20′ each. All observations were taken from the center two rows of each plot and destructive samples were collected only from plot border rows. Row spacing and plot maintenance were in accordance with standard grower practices at each site.

A total of 13 treatments were applied at each site (Table 7). Each PPFM strain was applied in two different manners (in-furrow and foliar) at a high and low rate, which differed between the two application methods. In-furrow treatments were applied at the time of planting by spray application over the open seed furrow. Foliar applications were applied at the V3 stage using a conventional boom. All applications were made with either flat fan or cone jet nozzles.

Early plant vigor was rated 20 and 60 days after emergence. Vigor ratings were given on a 1-5 scale based on visual assessment, with 1 being poor and 5 being excellent. Various parameters, including plant height, leaf area, color, and percent canopy closure, and incorporated into the visual assessment of plant vigor. Harvest was done per standard grower practices and plot yields were determined using conventional metered combine harvesters. Plot test weights were used to calculate bu/acre yield estimates for each plot.

TABLE 7

Treatments used in 2014 field trials

| Number | Name | Treatment | Application Timing | Rate[1] (mL/acre) | Titer range[2] (CFU/mL) |
|---|---|---|---|---|---|
| 1 | Check | Check | | Untreated | |
| 2 | 17_L_Inf | NLS0017 | In-furrow | 625 | $4.7 \times 10^8$-$2.2 \times 10^9$ |
| 3 | 17_H_Inf | NLS0017 | In-furrow | 1,250 | $4.7 \times 10^8$-$2.2 \times 10^9$ |
| 4 | 17_L_Fol | NLS0017 | Foliar | 2,500 | $4.7 \times 10^8$-$2.2 \times 10^9$ |
| 5 | 17_H_Fol | NLS0017 | Foliar | 5,000 | $4.7 \times 10^8$-$2.2 \times 10^9$ |
| 6 | 20_L_Inf | NLS0020 | In-furrow | 625 | $3.0 \times 10^8$-$3.1 \times 10^9$ |
| 7 | 20_H_Inf | NLS0020 | In-furrow | 1,250 | $3.0 \times 10^8$-$3.1 \times 10^9$ |

TABLE 7-continued

Treatments used in 2014 field trials

| Number | Name | Treatment | Application Timing | Rate[1] (mL/acre) | Titer range[2] (CFU/mL) |
|---|---|---|---|---|---|
| 8 | 20_L_Fol | NLS0020 | Foliar | 2,500 | $3.0 \times 10^8$-$3.1 \times 10^9$ |
| 9 | 20_H_Fol | NLS0020 | Foliar | 5,000 | $3.0 \times 10^8$-$3.1 \times 10^9$ |
| 10 | 64_L_Inf | NLS0064 | In-furrow | 625 | $3.7 \times 10^7$-$5.4 \times 10^8$ |
| 11 | 64_H_Inf | NLS0064 | In-furrow | 1,250 | $3.7 \times 10^7$-$5.4 \times 10^8$ |
| 12 | 64_L_Fol | NLS0064 | Foliar | 2,500 | $3.7 \times 10^7$-$5.4 \times 10^8$ |
| 13 | 64_H_Fol | NLS0064 | Foliar | 5,000 | $3.7 \times 10^7$-$5.4 \times 10^8$ |

[1] 'Rate' indicates the number of mL concentrated product applied per acre; this amount was diluted in a minimum of 5 gal/acre total volume for in-furrow applications and 15 gal/acre for foliar applications.
[2] 'Titer range' provides the lowest and highest titers for PPFM concentrates at the time of shipping to trial sites.

Results

Yield and early vigor data were analyzed using the JMP statistical analysis software package (Version 9.0). The full model with all random effects was fit first and then reduced to the best fitting model based on Akaike information criterion (AIC) values. Across locations means comparisons were conducted using Fisher's protected LSD test with $\alpha = \sim 0.05$, 0.10, and 0.20 (Table 8; Table 9).

TABLE 8

Yield increase across locations

| Number | Treatment | Mean yield (bu/acre) | Yield > Check at $\alpha$ = 0.05 | Yield > Check at $\alpha$ = 0.10 | Yield > Check at $\alpha$ = 0.20 | Rank |
|---|---|---|---|---|---|---|
| 1 | Check | 62.20 | | | | 12 |
| 2 | 17_L_Inf | 63.39 | | | | 9 |
| 3 | 17_H_Inf | 65.17 | X | X | X | 1 |
| 4 | 17_L_Fol | 62.00 | | | | 13 |
| 5 | 17_H_Fol | 65.09 | | X | X | 2 |
| 6 | 20_L_Inf | 63.17 | | | | 10 |
| 7 | 20_H_Inf | 64.63 | | | X | 4 |
| 8 | 20_L_Fol | 63.78 | | | | 6 |
| 9 | 20_H_Fol | 63.75 | | | | 7 |
| 10 | 64_L_Inf | 62.70 | | | | 11 |
| 11 | 64_H_Inf | 64.15 | | | X | 5 |
| 12 | 64_L_Fol | 63.55 | | | | 8 |
| 13 | 64_H_Fol | 65.00 | | X | X | 3 |

TABLE 9

Vigor (20 days post-emergence) increase across locations

| Number | Treatment | Mean vigor | Vigor > Check at $\alpha$ = 0.05 | Vigor > Check at $\alpha$ = 0.10 | Vigor > Check at $\alpha$ = 0.20 | Rank |
|---|---|---|---|---|---|---|
| 1 | Check | 3.60 | | | | 9 |
| 2 | 17_L_Inf | 3.62 | | | | 7 |
| 3 | 17_H_Inf | 3.89 | | X | X | 1 |
| 4 | 17_L_Fol | 3.58 | | | | 11 |
| 5 | 17_H_Fol | 3.64 | | | | 5 |
| 6 | 20_L_Inf | 3.64 | | | | 6 |
| 7 | 20_H_Inf | 3.69 | | | | 4 |
| 8 | 20_L_Fol | 3.61 | | | | 8 |
| 9 | 20_H_Fol | 3.44 | | | | 13 |
| 10 | 64_L_Inf | 3.75 | | | | 2 |
| 11 | 64_H_Inf | 3.72 | | | | 3 |
| 12 | 64_L_Fol | 3.49 | | | | 12 |
| 13 | 64_H_Fol | 3.60 | | | | 10 |

Treatment yield relative to the check for individual locations was analyzed in the same manner as the across locations data (Table 4). In the table below, yields significantly greater than the check at α=0.05, 0.10, and 0.20 are represented by 'XXX,' 'XX,' and 'X,' respectively.

TABLE 10

Yield increase over check by location

| Number | Treatment | AgPro | Buckeye | FC | Homer | Maloney | Rains | RFR |
|---|---|---|---|---|---|---|---|---|
| 1 | Check | | | | | | | |
| 2 | 17_L_Inf | XXX | | | | | | |
| 3 | 17_H_Inf | XXX | | | X | XX | | |
| 4 | 17_L_Fol | XXX | | | | | | |
| 5 | 17_H_Fol | XXX | | | | XX | | |
| 6 | 20_L_Inf | XXX | | | | | | X |
| 7 | 20_H_Inf | XXX | | | | XXX | | |
| 8 | 20_L_Fol | XXX | | | | | | |
| 9 | 20_H_Fol | XXX | | | | XXX | | |
| 10 | 64_L_Inf | XXX | | | | XXX | | |
| 11 | 64_H_Inf | XXX | | | | XXX | | |
| 12 | 64_L_Fol | XXX | | | | | | |
| 13 | 64_H_Fol | XXX | | | | XXX | | XXX |

At many locations, PPFM-treated plots had greater yields than the check but not at a statistically significant level. Due to the inherent variability of field research, these yield increases could still indicate significant biological effects by PPFMs. The yield increases facilitated by PPFM-application could also result in significant financial gains across large acreages. Consequently, yield values for each site are reported below and treatment yields numerically greater than the check have been highlighted (bolded and underlined) to demonstrate positive trends across locations (Table 11).

The results of these field trials indicate that all strains used in this trial have an overall positive effect on soy yields, but that this effect is most pronounced with NLS0017 applied as either a foliar or in-furrow treatment. Higher PPFM application rates generally resulted in greater yield increases. This trend further supports the beneficial effect of PPFM bacteria on soy yields and suggests that larger PPFM populations increase this effect.

Individual location data indicate that PPFMs generally have a beneficial effect on soy yield. RFR, the single site where PPFMs did not positively influence soy yield, had particularly high overall yields. This could indicate that RFR had an 'ideal' yield environment and suggests that the PPFM treatments used in these experiments offered yield protection and increased yield in the presence of various biotic and/or

TABLE 11

Average yields (bu/acre) by location

| Number | Treatment | AgPro | Buckeye | FC | Homer | Maloney | Rains | RFR |
|---|---|---|---|---|---|---|---|---|
| 1 | Check | 45.11 | 58.94 | 74.11 | 61.56 | 68.43 | 45.50 | 81.76 |
| 2 | 17_L_Inf | 52.65 | 56.65 | 71.16 | 64.74 | 69.49 | 48.10 | 80.94 |
| 3 | 17_H_Inf | 52.65 | 59.46 | 72.10 | 69.21 | 72.63 | 49.40 | 80.75 |
| 4 | 17_L_Fol | 51.25 | 59.04 | 67.52 | 61.17 | 69.86 | 48.10 | 77.01 |
| 5 | 17_H_Fol | 57.62 | 60.32 | 75.15 | 64.81 | 73.20 | 48.53 | 75.95 |
| 6 | 20_L_Inf | 55.20 | 58.56 | 72.76 | 59.24 | 70.09 | 50.27 | 76.09 |
| 7 | 20_H_Inf | 61.17 | 57.02 | 70.64 | 62.34 | 75.58 | 47.67 | 78.00 |
| 8 | 20_L_Fol | 53.00 | 55.79 | 75.85 | 63.99 | 70.25 | 49.40 | 78.17 |
| 9 | 20_H_Fol | 52.66 | 58.20 | 75.44 | 61.48 | 76.06 | 48.53 | 73.54 |
| 10 | 64_L_Inf | 52.17 | 57.00 | 67.61 | 63.84 | 74.42 | 45.50 | 78.31 |
| 11 | 64_H_Inf | 52.83 | 59.11 | 74.05 | 60.38 | 73.15 | 48.97 | 80.53 |
| 12 | 64_L_Fol | 57.49 | 57.54 | 77.99 | 58.15 | 69.18 | 46.37 | 78.10 |
| 13 | 64_H_Fol | 58.59 | 56.97 | 72.07 | 65.94 | 74.41 | 52.87 | 74.11 |

CONCLUSIONS

Three elite PPFM isolates were evaluated for their ability to increase soybean yield in 2014 field trials. In these trials, all treatments significantly increased yield over a check at a minimum of one location. Across locations, the high rates of all isolates applied as either an in-furrow or a foliar treatment, with the exception of NLS0020 in-furrow, significantly increased soy yields at α=0.20. The high rate of both NLS0017 foliar and in-furrow treatments and NLS0064 foliar increased yield over the check at all locations when a more stringent level of α was applied. The high rate of NLS0017 in-furrow was the only treatment to significantly increase vigor at 20 days post-emergence in these experiments.

abiotic stressors at other locations but did not significantly affect yield under ideal growth conditions at RFR.

REFERENCES

1. Abanda-Nkpwatt, D., M. Musch, J. Tschiersch, M. Boettner, and W. Schwab. 2006. Molecular interaction between *Methylobacterium extorquens* and seedlings: growth promotion, methanol consumption, and localization of the methanol emission site. J. Exp. Bot. 57: 4025-4032.
2. Broekaert W F, Terras F R, Cammue B P, Vanderleyden J (1990) An automated quantitative assay for fungal growth inhibition. FEMS Microbiology Letters 69: 55-60.
3. Cao, Y-R, Wang, Q., Jin, R-X., Tang, S-K., He, W-X., Lai, H-X, Xu, L-H., and C-L Jiang. 2011. *Methylobacterium* soli sp. nov. a methanol-utilizing bacterium isolated from the forest soil. Antonie van Leeuwenhoek (2011) 99:629-634.
4. Corpe, W. A., and D. V. Basile. 1982. Methanol-utilizing bacteria associated with green plants. Devel. Industr. Microbiol. 23: 483-493.
5. Corpe, W. A., and S. Rheem. 1989. Ecology of the methylotrophic bacteria on living leaf surfaces. FEMS Microbiol. Ecol. 62: 243-250.
6. Green, P. N. 2005. *Methylobacterium*. In Brenner, D. J., N. R. Krieg, and J. T. Staley (eds.). "Bergey's Manual of Systematic Bacteriology. Volume two, The Proteobacteria. Part C, The alpha-, beta-, delta-, and epsilonproteobacteria." Second edition. Springer, New York. Pages 567-571.
7. Green, P. N. 2006. *Methylobacterium*. In Dworkin, M., S. Falkow, E. Rosenberg, K.-H. Schleifer, and E. Stackebrandt (eds.). "The Prokaryotes. A Handbook on the Biology of Bacteria. Volume 5. Proteobacteria: Alpha and Beta Subclasses." Third edition. Springer, New York. Pages 257-265.
8. Holland, M. A. 1997. *Methylobacterium* and plants. Recent. Res. Devel. in Plant Physiol. 1: 207-213.
9. Holland, M. A., and J. C. Polacco. 1994. PPFMs and other covert contaminants: Is there more to plant physiology than just plant? Annu. Rev. Plant Physiol. Plant Mol. Biol. 45: 197-209.
10. Kutschera, U. 2007. Plant-associated methylobacteria as co-evolved phytosymbionts. A hypothesis. Plant Signal Behav. 2: 74-78.
11. Lidstrom, M. E. 2006. Aerobic methylotrophic prokaryotes. In Dworkin, M., S. Falkow, E. Rosenberg, K.-H. Schleifer, and E. Stackebrandt (eds.). "The Prokaryotes. A Handbook on the Biology of Bacteria. Volume 2. Ecophysiology and biochemistry." Third edition. Springer, New York. Pages 618-634.
12. Madhaiyan, M., S. Poonguzhali, H. S. Lee, K. Hari, S. P. Sundaram, and T. M. Sa. 2005. Pink-pigmented facultative methylotrophic bacteria accelerate germination, growth and yield of sugarcane clone Co86032 (*Saccharum officinarum* L.) Biol. Fertil. Soils 41: 350-358.
13. Madhaiyan, M., S. Poonguzhali, M. Senthilkumar, S. Seshadri, H. Chung, J. Yang, S. Sundaram, and T. Sa. 2004. Growth promotion and induction of systemic resistance in rice cultivar CO-47 (*Oryza sativa* L.) by *Methylobacterium* spp. Bot. Bull. Acad. Sin. 45: 315-324.
14. Madhaiyan, M., S. Poonguzhali, and T. Sa. 2007. Influence of plant species and environmental conditions on epiphytic and endophytic pink-pigmented facultative methylotrophic bacterial populations associated with field-grown rice cultivars. J Microbiol Biotechnol. 2007 October; 17(10):1645-54.
15. Stanier, R. Y., N. J. Palleroni, and M. Doudoroff. 1966. The aerobic pseudomonads: A taxonomic study. J. Gen. Microbiol. 43: 159-271.
16. Sy, A., Giraud, E., Jourand, P., Garcia, N., Willems, A., De Lajudie, P., Prin, Y., Neyra, M., Gillis, M., Boivin-Masson, C., and Dreyfus, B. 2001. Methylotrophic *Methylobacterium* Bacteria Nodulate and Fix Nitrogen in Symbiosis with Legumes. Jour. Bacteriol. 183(1):214-220,
17. Sy, A., A. C. J. Timmers, C. Knief, and J. A. Vorholt. 2005. Methylotrophic metabolism is advantageous for *Methylobacterium extorquens* during colonization of *Medicago truncatula* under competitive conditions. Appl. Environ. Microbiol. 71: 7245-7252.18. Vogel, H. J., and D. M. Bonner. 1956. Acetylornithinase of *Escherichia coli*: Partial purification and some properties. J. Biol. Chem. 218: 97-106.
18. Vogel, H. J. 1956. A convenient growth medium for *Neurospora* (Medium N). Microbial Genet Bull 13: 42-43
19. Whittenbury, R., S. L. Davies, and J. F. Wilkinson. 1970. Enrichment, isolation and some properties of methane-utilizing bacteria. J. Gen. Microbiol. 61: 205-218.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. A method for improving soybean plant yield wherein said method comprises:
   1) coating or partially coating a soybean plant seed with:
      i) a composition comprising an essentially dry fermentation product having about 5% or less water content, wherein said fermentation product comprises a *Methylobacterium* of NLS0064, deposited as NRRL B-50938; and
      ii) an agriculturally acceptable excipient selected from the group consisting of woodflours, clays, activated carbon, diatomaceous earth, fine-grain inorganic solids and calcium carbonate; and/or
      an agriculturally acceptable adjuvant selected from the group consisting of polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylamide polymers and copolymers, polyhydroxyethyl acrylate, methylacrylamide monomers, alginate, ethylcellulose, polychloroprene and syrups or mixtures thereof;
   2) growing a soybean plant from said soybean plant seed; and
   3) harvesting at least one soybean plant part from said soybean plant, wherein the *Methylobacterium* provides for increased yield of said soybean plant part in comparison to yield of said soybean plant part from a soybean plant grown from a soybean seed not treated with the *Methylobacterium* of NLS0064.

2. The method of claim 1, wherein said clays and inorganic solids are selected from the group consisting of calcium bentonite, kaolin, china clay, talc, perlite, mica, vermiculite, silicas, quartz powder, montmorillonite and mixtures thereof.

3. The method of claim 1, wherein said harvested plant part is soybean seed.

4. The method of claim 3, wherein said soybean seed is harvested from a mature soybean plant.

5. The method of claim 1, wherein said method further comprises obtaining a processed food or feed composition from said harvested plant part.

6. The method of claim 5, wherein said processed food or feed composition is a meal or a paste.

7. The method of claim 1, wherein the composition comprises the *Methylobacterium* at a titer of about $5 \times 10^8$ CFU/gm to about $6 \times 10^{10}$ CFU/gm.

8. A method of claim 1, wherein said composition further comprises a *Methylobacterium* selected from the group consisting of: NLS0017, deposited as NRRL B-50931; and NLS0020, deposited as NRRL B-50930.

9. A composition comprising:
i) a population of soybean seeds for planting;
ii) an agriculturally acceptable excipient selected from the group consisting of woodflours, clays, activated carbon, diatomaceous earth, fine-grain inorganic solids and calcium carbonate; and/or
an agriculturally acceptable adjuvant selected from the group consisting of polyvinyl acetates, polyvinyl acetate copolymers, hydrolyzed polyvinyl acetates, polyvinylpyrrolidone-vinyl acetate copolymer, polyvinyl alcohols, polyvinyl alcohol copolymers, polyvinyl methyl ether, polyvinyl methyl ether-maleic anhydride copolymer, waxes, latex polymers, celluloses hydroxy methylcelluloses, hydroxypropylcellulose, hydroxymethylpropylcelluloses, polyvinyl pyrrolidones, alginates, dextrins, malto-dextrins, polysaccharides, fats, oils, proteins, karaya gum, jaguar gum, tragacanth gum, polysaccharide gums, mucilage, gum arabics, shellacs, vinylidene chloride polymers and copolymers, soybean-based protein polymers and copolymers, lignosulfonates, acrylic copolymers, starches, polyvinylacrylates, zeins, gelatin, carboxymethylcellulose, chitosan, polyethylene oxide, acrylamide polymers and copolymers, polyhydroxyethyl acrylate, methylacrylamide monomers, alginate, ethylcellulose, polychloroprene and syrups or mixtures thereof; and
iii) an essentially dry fermentation product having about 5% or less water content, wherein said fermentation product comprises a *Methylobacterium* of NLS0064, deposited as NRRL B-50938; wherein said fermentation product is essentially free of contaminating microorganisms.

10. The composition of claim 9, wherein said essentially dry fermentation product is obtained by lyophilization or spray drying.

11. The composition of claim 9, wherein said clays and inorganic solids are selected from the group consisting of calcium bentonite, kaolin, china clay, talc, perlite, mica, vermiculite, silicas, quartz powder, montmorillonite and mixtures thereof.

12. The composition of claim 9, wherein said composition comprises an agriculturally acceptable adjuvant selected from the group consisting of a wetter/spreader, sticker, penetrant, extender, and humectant.

13. The composition of claim 9, wherein said *Methylobacterium* is at a titer of about $1 \times 10^6$ CFU/gm to about $1 \times 10^{14}$ CFU/gm.

14. The composition of claim 9, wherein said composition further comprises a *Methylobacterium* selected from the group consisting of: NLS0017, deposited as NRRL B-50931; and NLS0020, deposited as NRRL B-50930.

15. The composition of claim 9, wherein the composition further comprises an active selected from the group consisting of an insecticide, a nematicide, a fungicide, and a biopesticidal or beneficial microorganism.

16. The composition of claim 15, wherein said biopesticidal or beneficial microorganism is selected from the group consisting of *Bacillus subtilis, Bacillus thuringiensis, Bacillus pumilis, Pseudomonas syringae, Trichoderma harzianum, Trichoderma virens*, and *Streptomyces lydicus*.

\* \* \* \* \*